US009311688B1

(12) United States Patent
Rosenberg et al.

(10) Patent No.: US 9,311,688 B1
(45) Date of Patent: Apr. 12, 2016

(54) RENDERING PIPELINE FOR COLOR ELECTROPHORETIC DISPLAYS

(75) Inventors: Ilya D. Rosenberg, Mountain View, CA (US); Tomer Moscovich, San Francisco, CA (US)

(73) Assignee: Amazon Technologies, Inc., Reno, NV (US)

( * ) Notice: Subject to any disclaimer, the term of this patent is extended or adjusted under 35 U.S.C. 154(b) by 442 days.

(21) Appl. No.: 13/484,204

(22) Filed: May 30, 2012

(51) Int. Cl.
*G06T 1/20* (2006.01)

(52) U.S. Cl.
CPC ........................................ *G06T 1/20* (2013.01)

(58) Field of Classification Search
CPC ......... G06T 1/20; G06T 3/403; G06T 11/203; G09G 3/2044; G09G 3/2051; G09G 5/391; G09G 3/2059; G09G 2320/066; H04N 1/6058; H04N 1/60; H04N 1/62; H04N 1/58
See application file for complete search history.

(56) References Cited

U.S. PATENT DOCUMENTS

| | | | | |
|---|---|---|---|---|
| 6,757,081 | B1 * | 6/2004 | Fan et al. | 358/474 |
| 2005/0275657 | A1 * | 12/2005 | Hutchins et al. | 345/506 |
| 2009/0284546 | A1 * | 11/2009 | Brown Elliott | 345/596 |

OTHER PUBLICATIONS

"Image Dithering: Eleven Algorithms and Source Code." Helland, Tanner. Dec. 28, 2012 Accessed via the Web @ http://www.tannerhelland.com/4660/dithering-eleven-algorithms-source-code/ on Mar. 14, 2015.*

Ostromoukhov, "A Simple and Efficient Error-Diffusion Algorithm," In Proceedings of SIGGRAPH 2001, in ACM Computer Graphics, Annual Conference Series, Aug. 2001, 6 pages.

* cited by examiner

*Primary Examiner* — Antonio A Caschera
(74) *Attorney, Agent, or Firm* — Lee & Hayes, PLLC

(57) ABSTRACT

A plurality of different procedures are used to improve a quality of an RGBW color mosaic image displayed on an electronic paper display, such as an electrophoretic display of an electronic device. By processing lines of an input color image within a pipeline, less memory is required, since intermediate images need not be stored between each successive procedures. The different procedures can include contrast enhancement, color downsampling, saturation boosting, fringe reduction, and dithering to reduce color banding. Fringe reduction is implemented by computing desired and perceived values for each color component of a pixel currently being processed, and desired and perceived values for the luma of an input pixel, and then convolving these values using convolution filters having values selected so that a total color component weight is the same for all of the color filters, thereby preserving color balance in the color image that is to be rendered.

39 Claims, 24 Drawing Sheets
(7 of 24 Drawing Sheet(s) Filed in Color)

PIPELINE
RGB 1024X768 IMAGE 402
404 CONTRAST ENHANCEMENT
406 COLOR DOWNSAMPLING
408 SATURATION BOOST
410 FRINGE REDUCTION
412 DITHERING
RGBW MOSAIC 1024X768 IMAGE 414
400

EXAMPLE OF AN IMAGE ON AN EPD

114

316
318

314

316
318
314

COLOR DOWNSAMPLING ( PRESERVES LUMINANCE OF EACH PIXEL, WHILE REDUCING THE COLOR RESOLUTION BY A FACTOR OF TWO)

COLOR DOWNSAMPLING ( PRESERVES LUMINANCE OF EACH PIXEL, WHILE REDUCING THE COLOR RESOLUTION BY A FACTOR OF TWO)

SATURATION BOOST
(INCREASES DIFFERENCE BETWEEN LOWEST AND HIGHEST COLOR COMPONENT)

SATURATION BOOST
(INCREASES DIFFERENCE BETWEEN LOWEST AND HIGHEST COLOR COMPONENT)

FRINGE REDUCTION

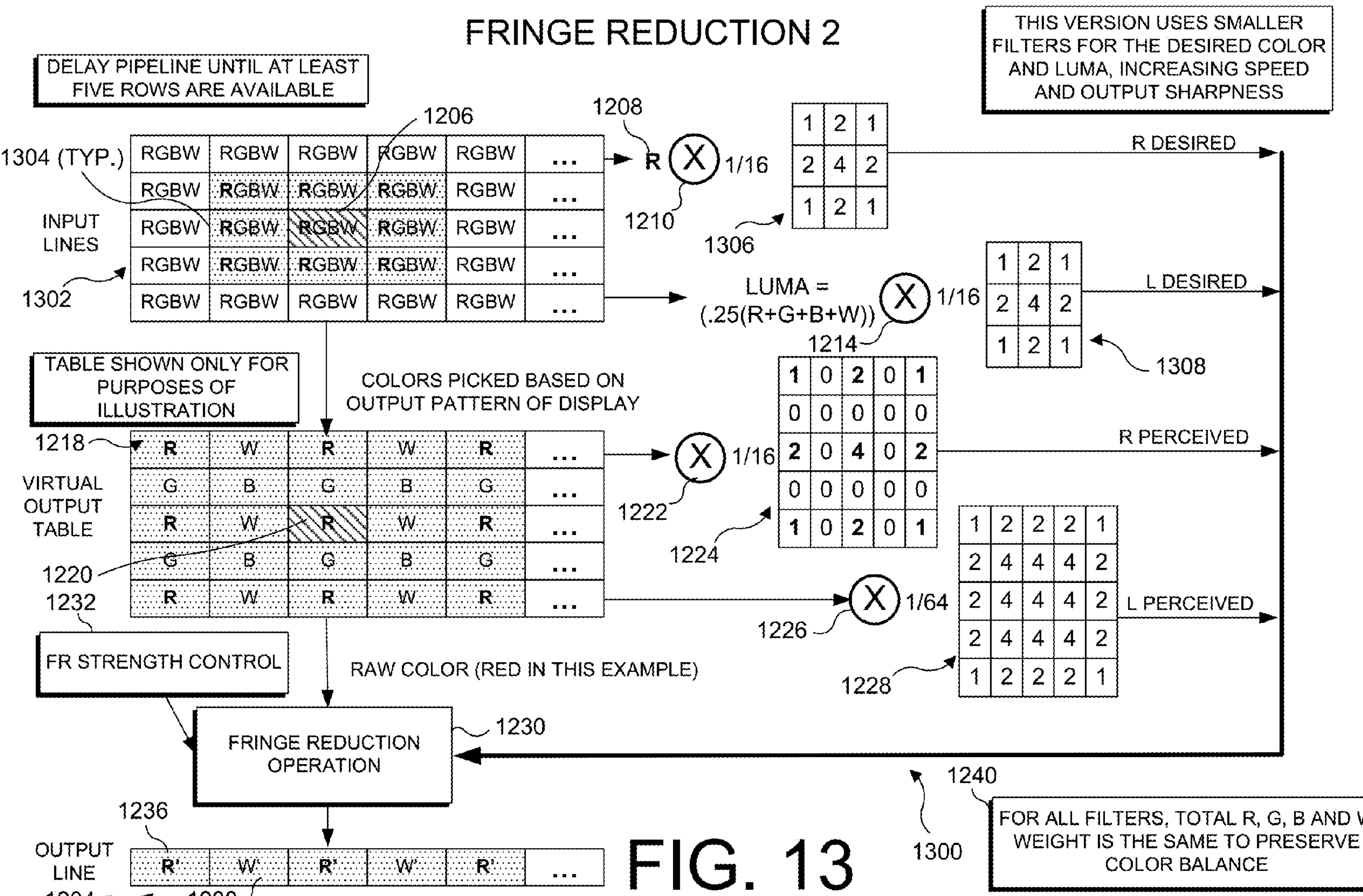
FRINGE REDUCTION 2
DELAY PIPELINE UNTIL AT LEAST FIVE ROWS ARE AVAILABLE
THIS VERSION USES SMALLER FILTERS FOR THE DESIRED COLOR AND LUMA, INCREASING SPEED AND OUTPUT SHARPNESS
1304 (TYP.)
INPUT LINES
1302
1206
RGBW
1208
R
1210
1/16
1306
LUMA = (.25(R+G+B+W))
1214
1/16
1308
R DESIRED
L DESIRED
R PERCEIVED
L PERCEIVED
TABLE SHOWN ONLY FOR PURPOSES OF ILLUSTRATION
COLORS PICKED BASED ON OUTPUT PATTERN OF DISPLAY
1218
VIRTUAL OUTPUT TABLE
1220
1232
1222
1/16
1224
1226
1/64
1228
RAW COLOR (RED IN THIS EXAMPLE)
FR STRENGTH CONTROL
FRINGE REDUCTION OPERATION
1230
1240
1300
FOR ALL FILTERS, TOTAL R, G, B AND W WEIGHT IS THE SAME TO PRESERVE COLOR BALANCE
OUTPUT LINE
1234
1236
1238
R'
W'
FIG. 13

DITHERING
1500
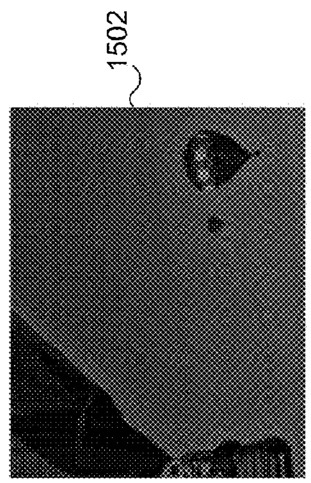
1504
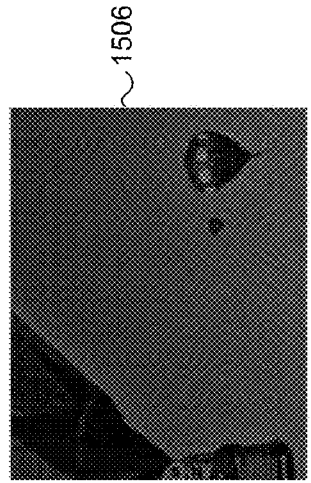
FIG. 15A
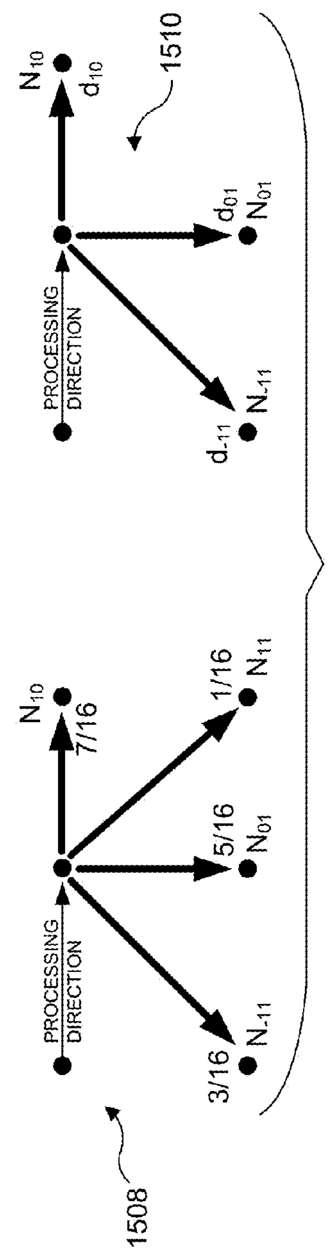
FIG. 15B

DITHERING

DIFFUSE ERROR TO NEARBY PIXELS, TREATING ENTIRE IMAGE AS GRAYSCALE, TO MAKE COLOR TRANSITIONS SMOOTHER

ERROR DISTRIBUTION TABLES
1608
1600
SCAN DIRECTION ALTERNATES LINE TO LINE
ERROR DISTRIBUTION FUNCTION
1606
1618 (TYP.)
+=
+=
+=
E
...
1624 (TYP.)
1622
PIXEL VALUE
1612
INPUT LINE
1602
G
1604
1610
1614
1616
1620
1628
G'
1626

RENDERING PIPELINE FOR COLOR ELECTROPHORETIC DISPLAYS

BACKGROUND

A large and growing population of users is enjoying entertainment through the consumption of digital content, such as music, movies, images, electronic books, and so on. The users employ various electronic devices to consume such content. Among these electronic devices are electronic book (eBook) reader devices, cellular telephones, personal digital assistants (PDAs), portable media players, tablet computers, netbooks, and the like. As the quantity of available electronic media content continues to grow, along with increasing proliferation of devices to consume that media content, finding ways to enhance user experience continues to be a priority.

Electronic paper displays (EPDs), also referred to as electronic ink (e-ink) displays, are often used for eBook readers, because like paper, the image that they display is viewed using reflected light, rather than emitted light as is the case with a liquid crystal display (LCD) or light emitting diode LED display. As a result, EPDs provide a clear image in bright sunlight. Because the image on an EPD does not need to be constantly refreshed, very little electrical power is required for the display. Text remains readable once it has been initially rendered on the EPD, and electrical energy is consumed by the EPD only when the image that appears is changed so that a new image must be rendered.

For eBook devices, 16 gray levels for each pixel are sufficient to produce gray-scale graphic images and text. However, electrophoretic displays can include red, green, and blue (RGB) filters, with a different color filter overlaying each pixel of an electronic ink display, to produce a color EPD image. Unfortunately, the color filter reduces the intensity of reflected light so that the brightness of the color image rendered on the EPD is diminished, compared to a corresponding gray-scale image rendered on the display. To compensate, a white pixel can be included for each set of red, green, and blue pixels, producing an RGBW display with increased brightness. Although an RGBW electrophoretic EPD provides a brighter image, the resulting image will often have low contrast, low saturation, color fringing, and color banding in areas of color gradient.

BRIEF DESCRIPTION OF THE DRAWINGS

Various aspects and attendant advantages of one or more illustrative embodiments and modifications thereto will become more readily appreciated as the same becomes better understood by reference to the following detailed description, when taken in conjunction with the accompanying drawings. In the figures, the left-most digit(s) of a reference number identifies the figure in which the reference number first appears. The use of the same reference numbers in different figures indicates similar or identical items or features.

The patent or application file contains drawings executed in color. Copies of this patent or patent application publication with color drawings will be provided by the Office upon request and payment of the necessary fee.

Figure 1A:
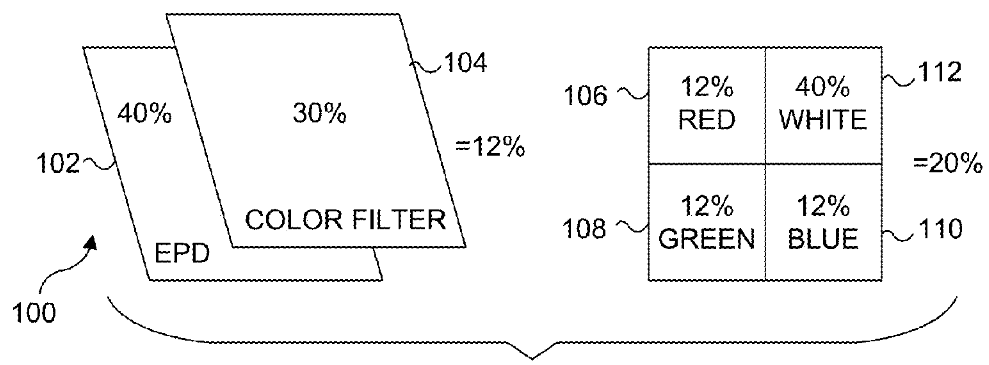
Figure 1B:
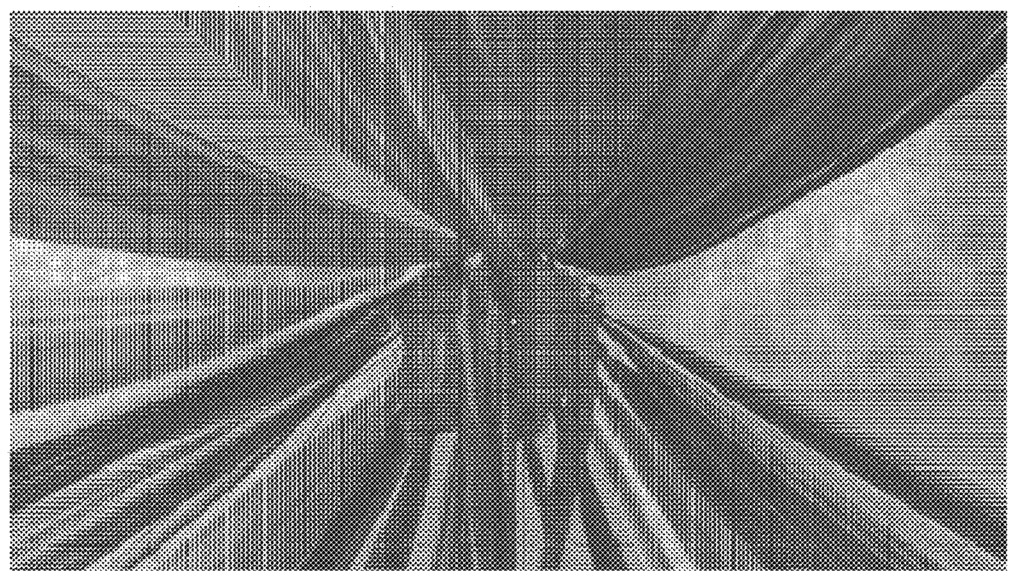
Figure 1C:
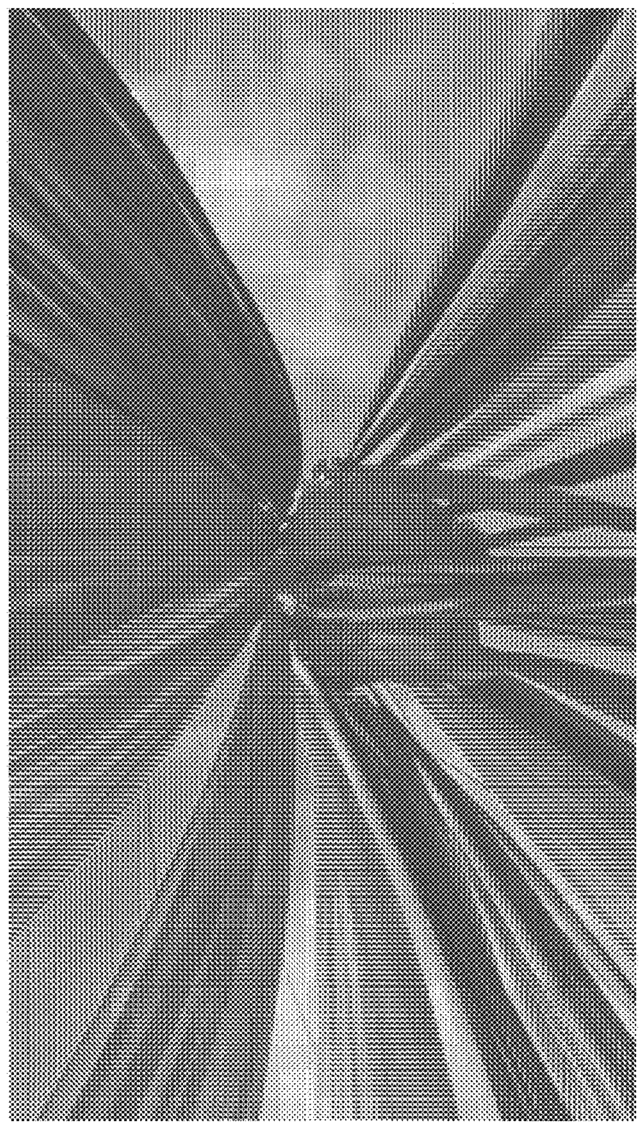
Figure 2A:
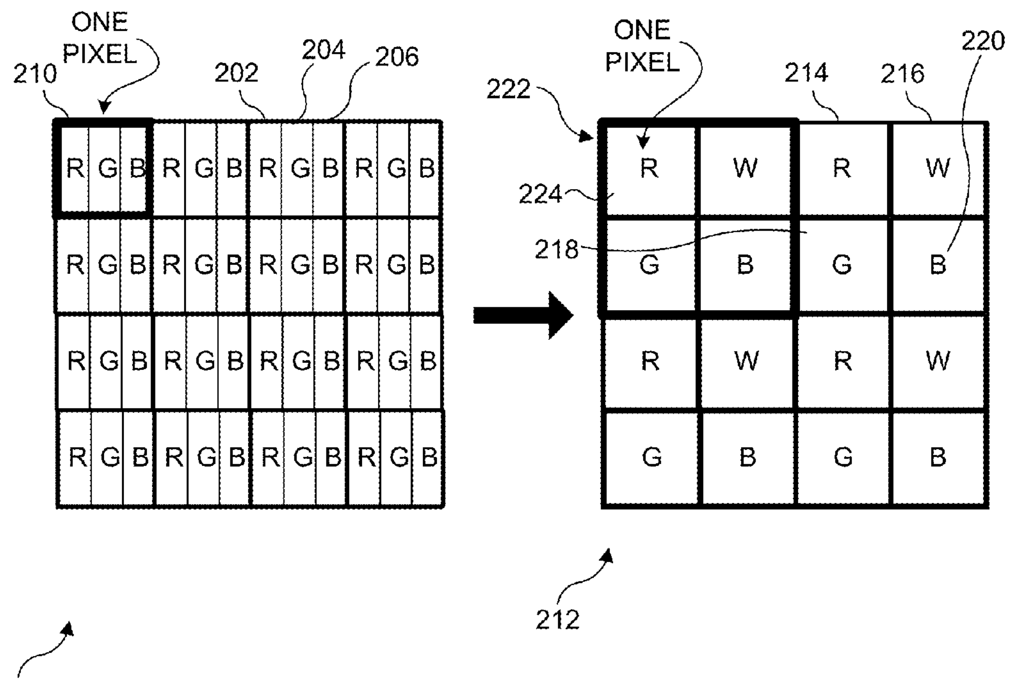
Figure 2B:
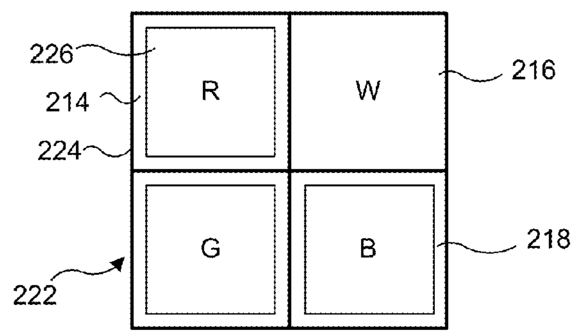
Figures 3A, 3B:
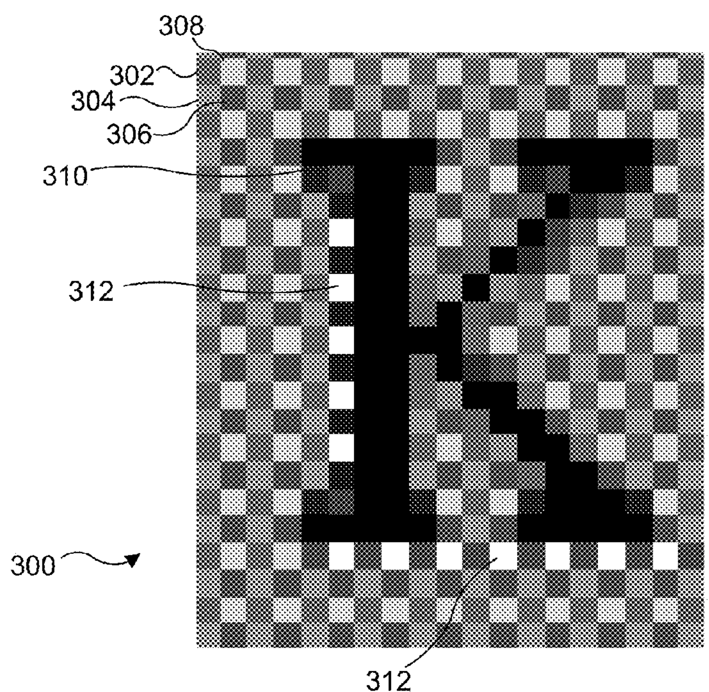
Figures 3C, 3D:
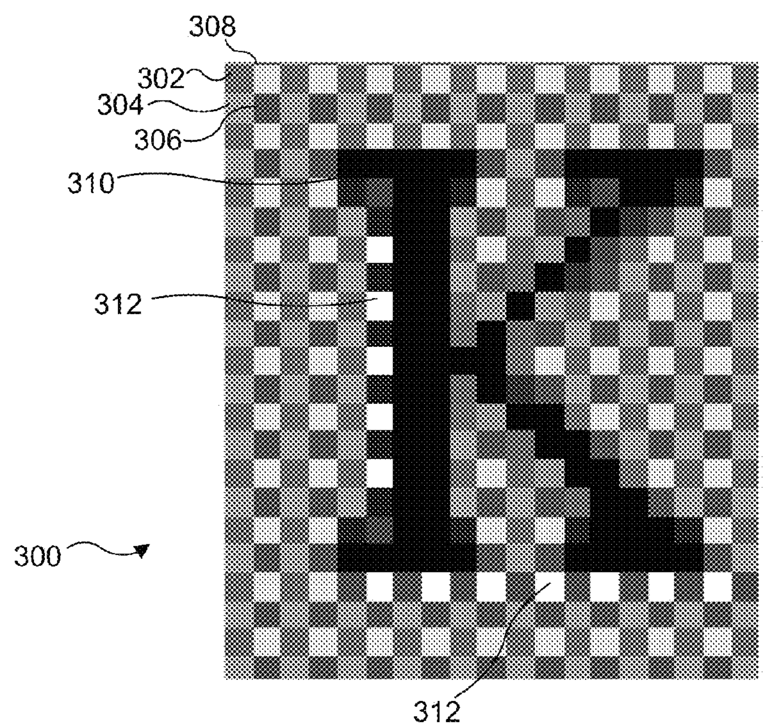
Figure 4:
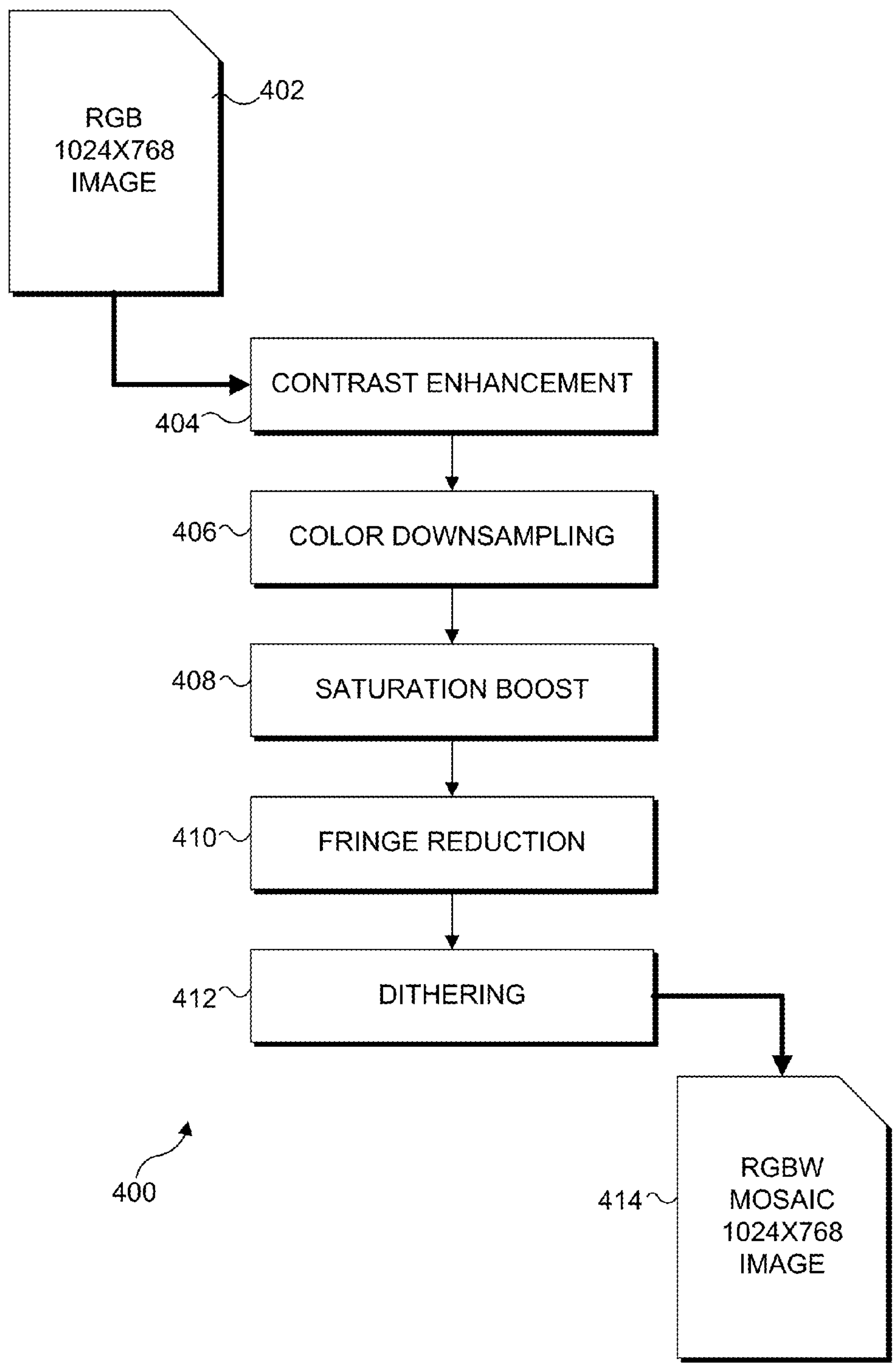
Figure 5A:
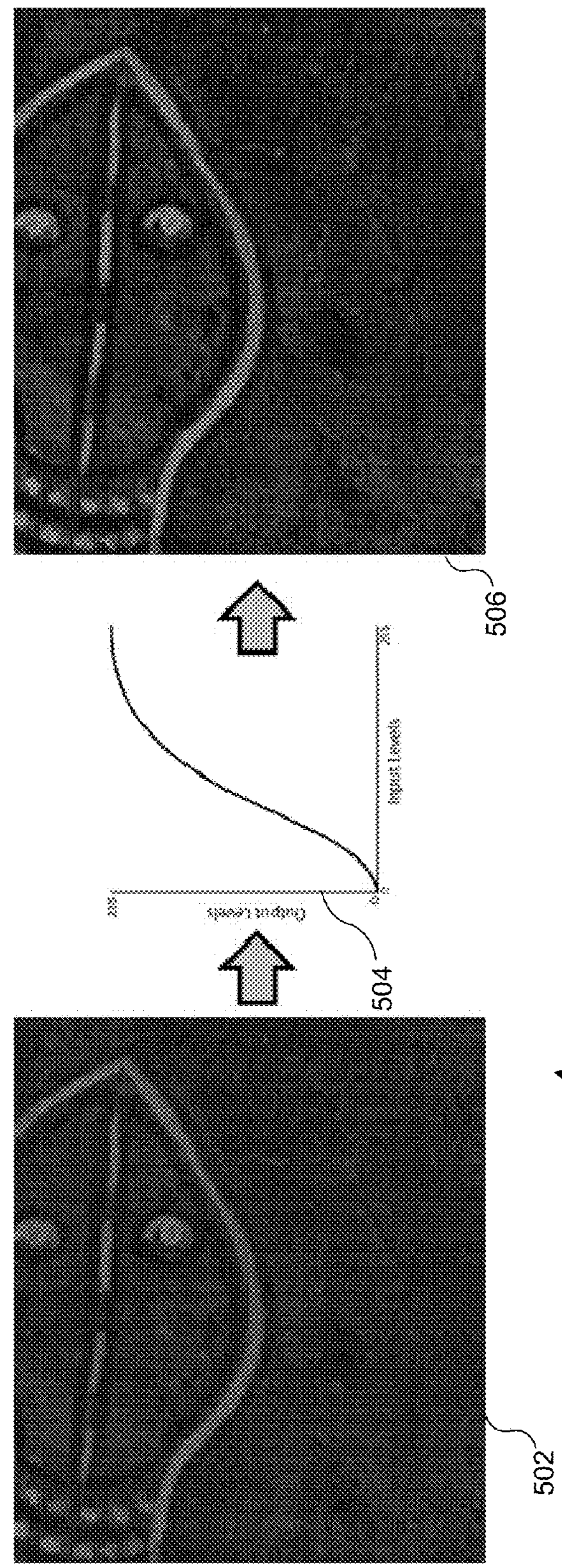
Figure 5B:
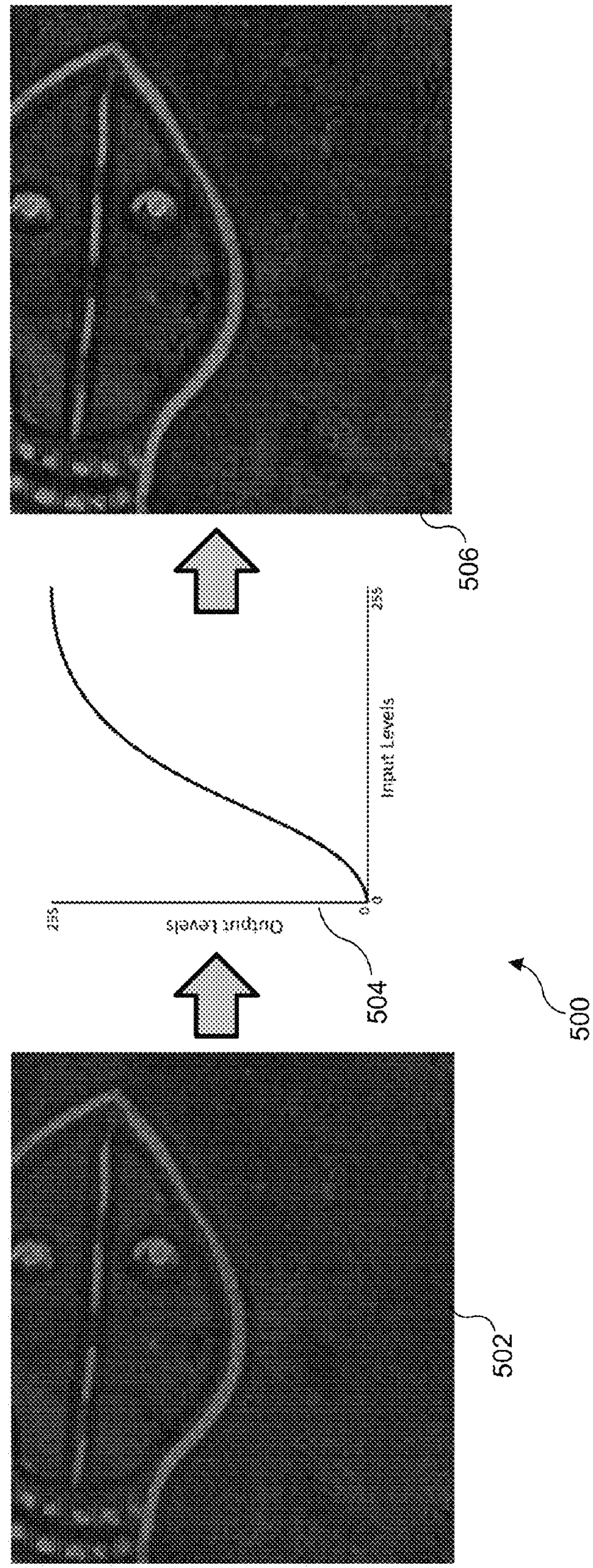
Figure 6:
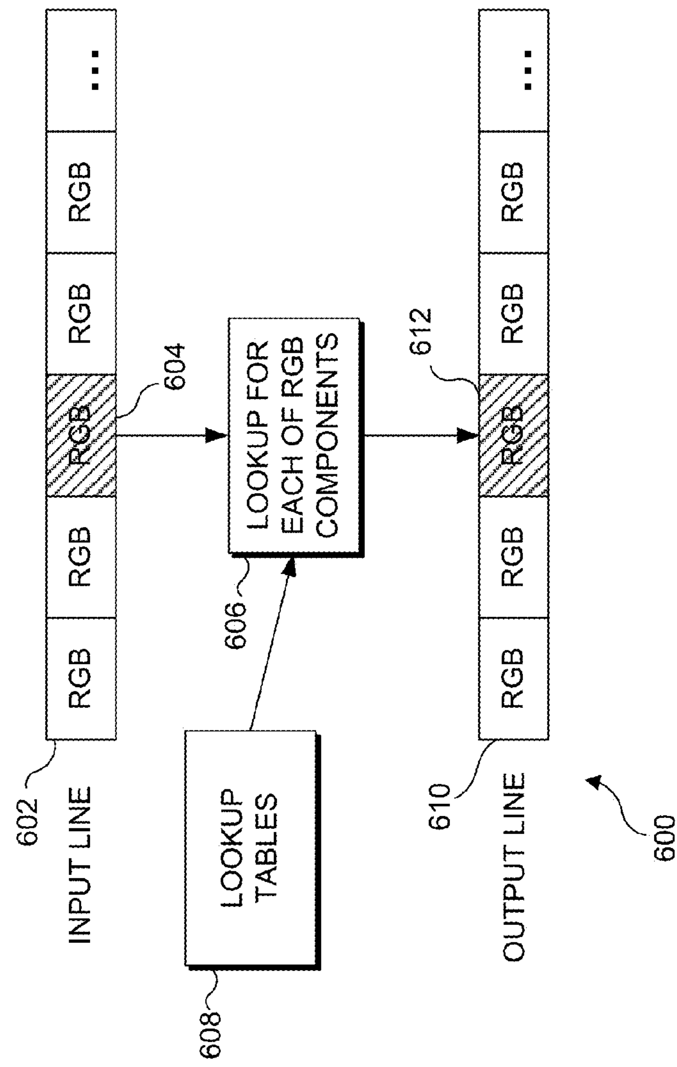
Figure 7A:
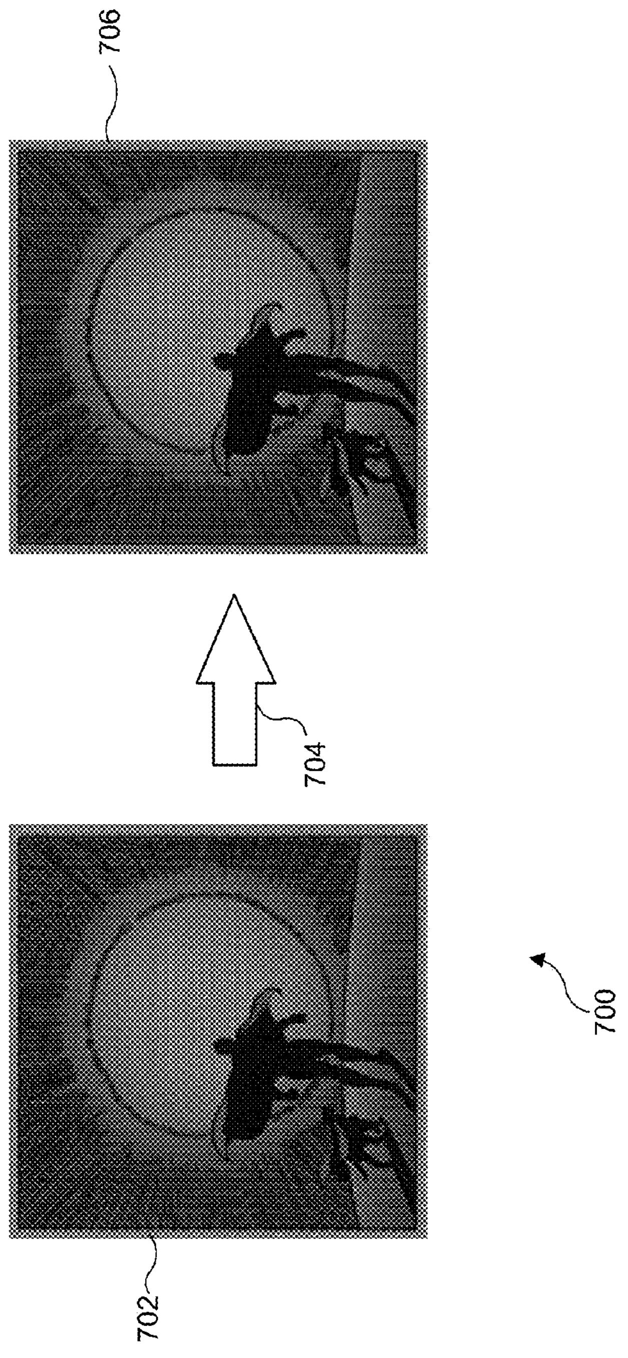
Figure 7B:
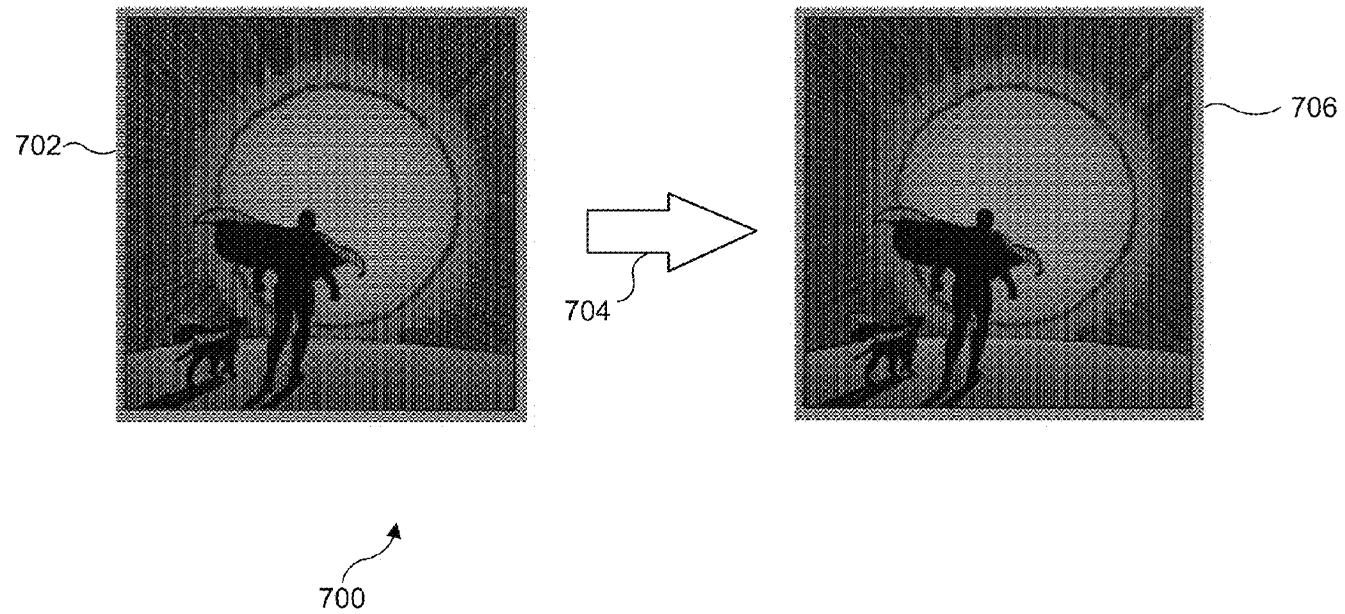
Figure 8:
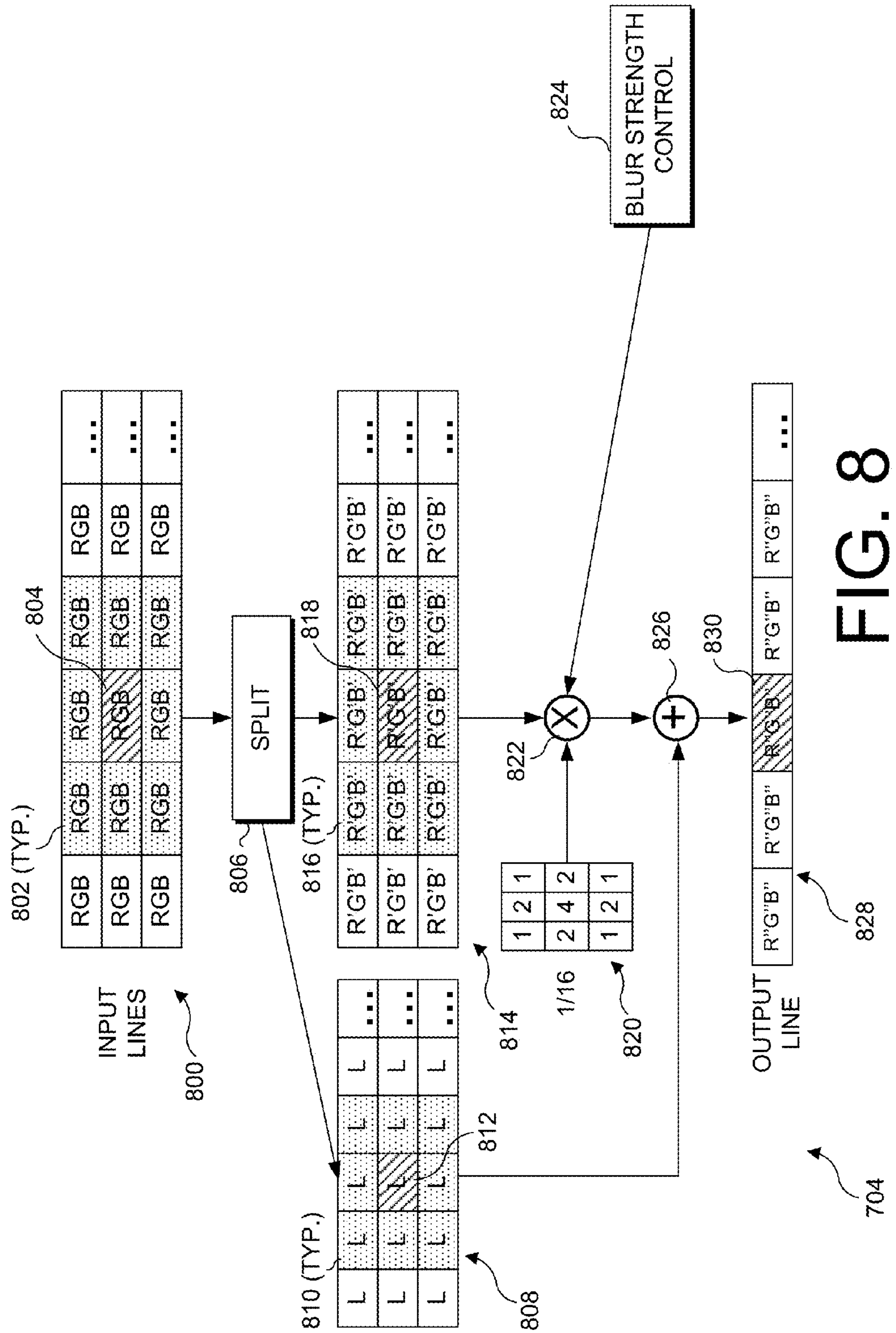
Figure 9A:
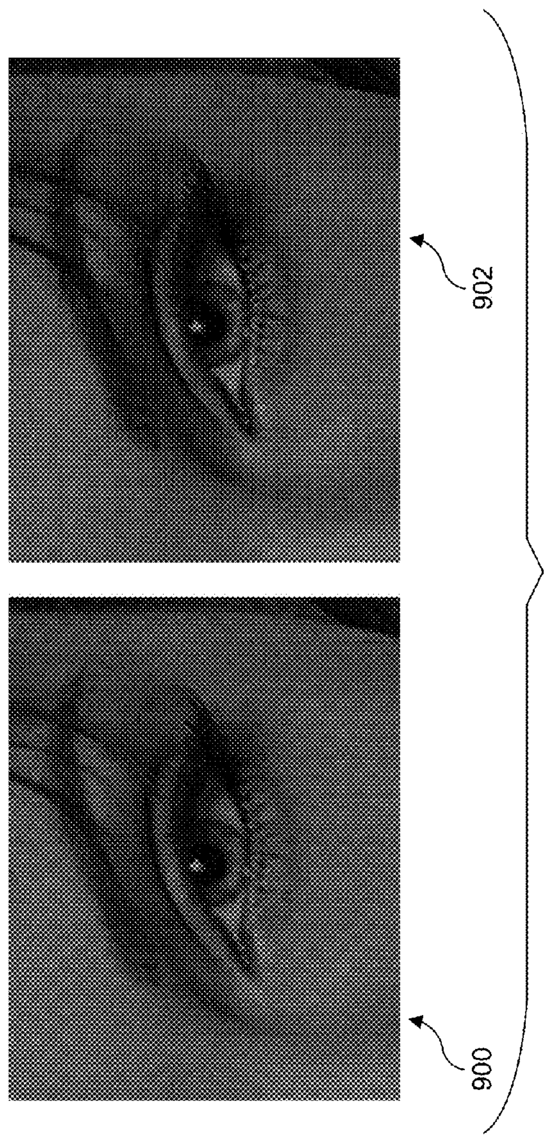
Figure 9B:
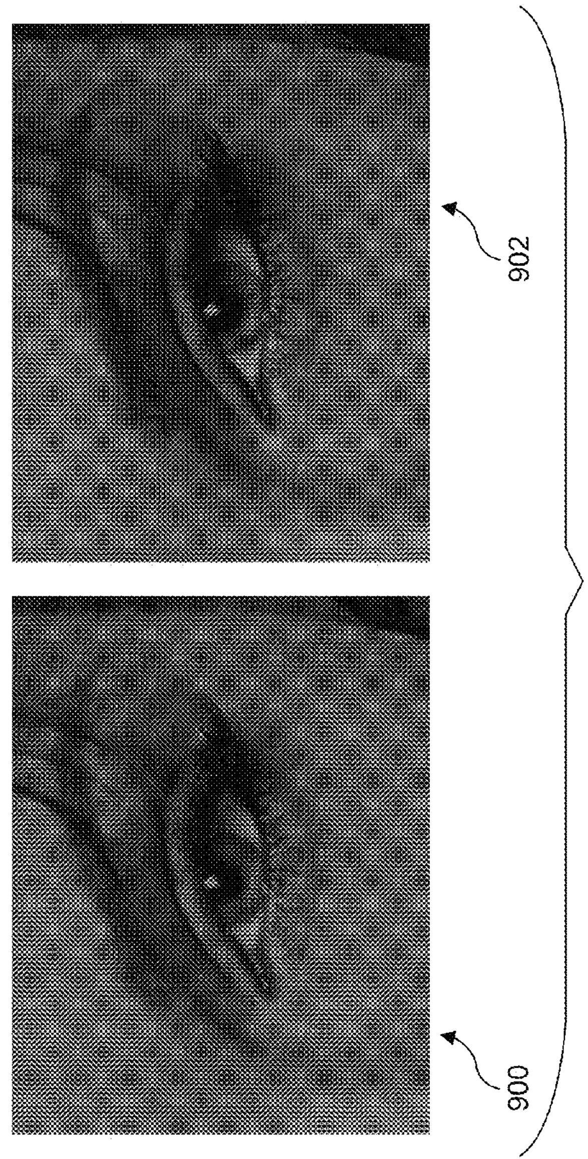
Figure 10:
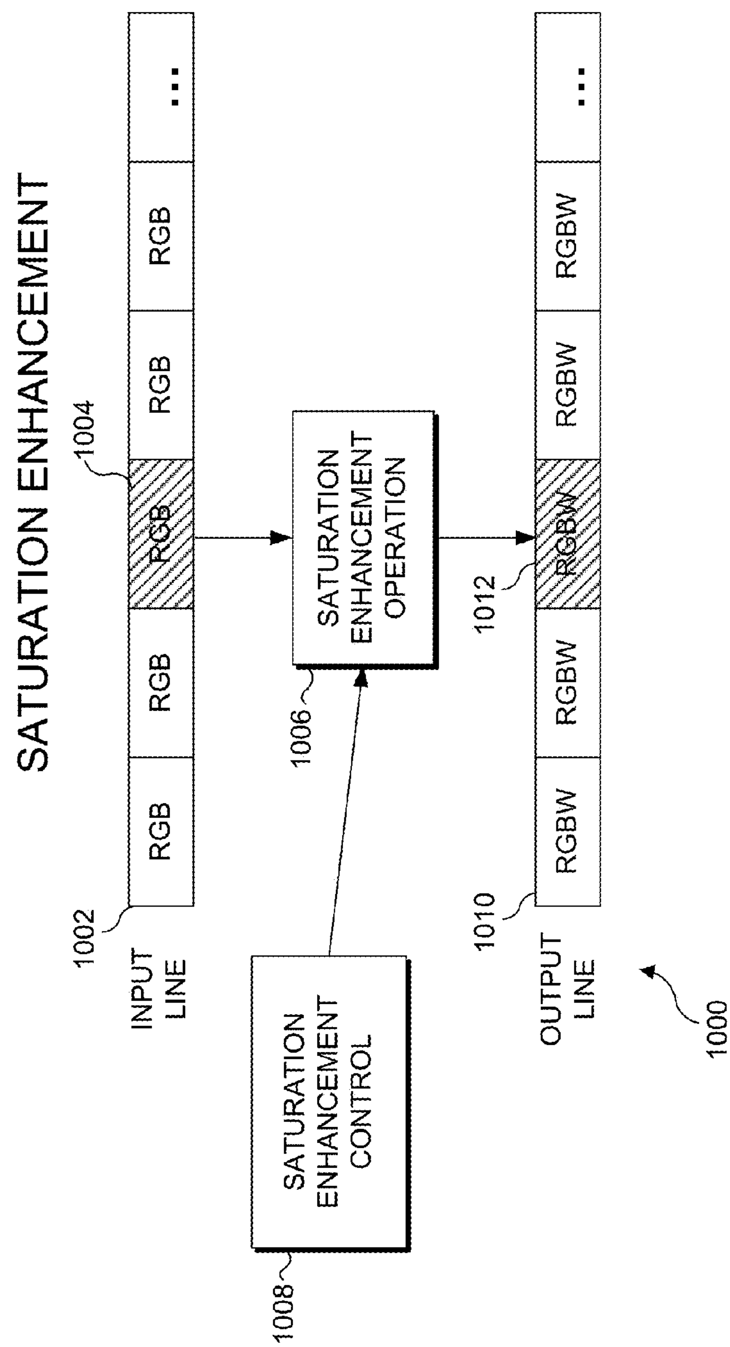
Figure 11A:
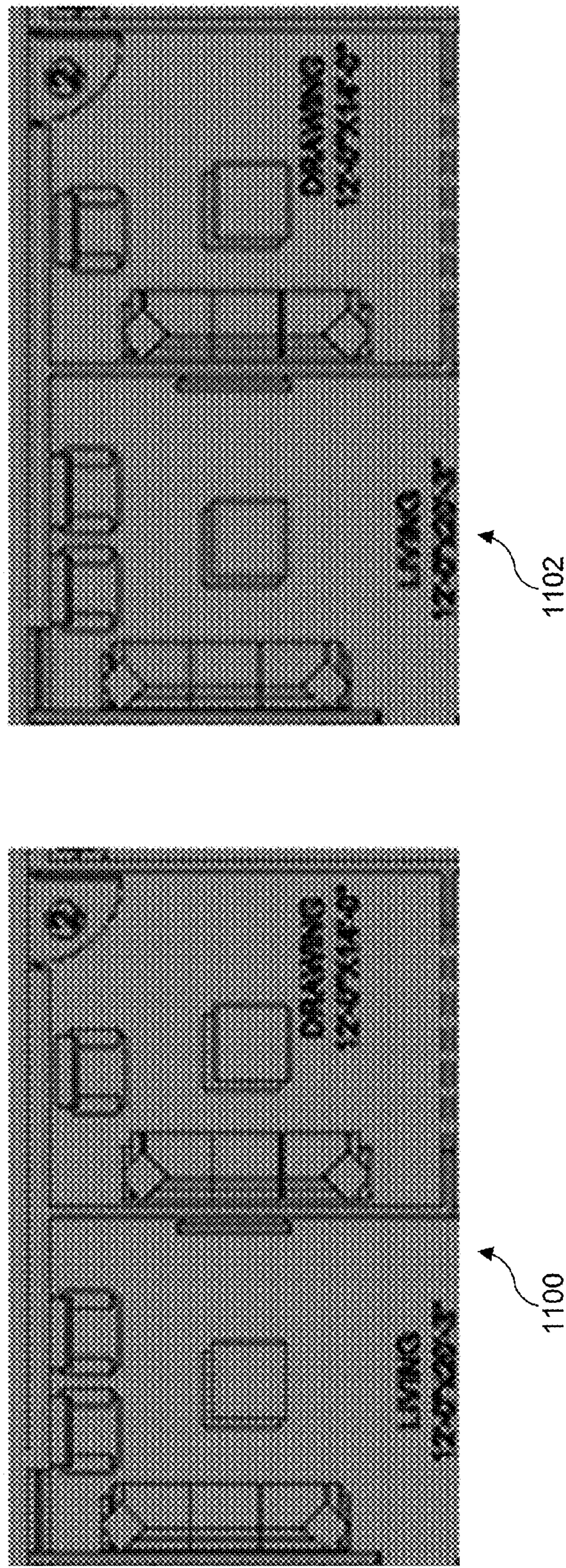
Figure 11B:
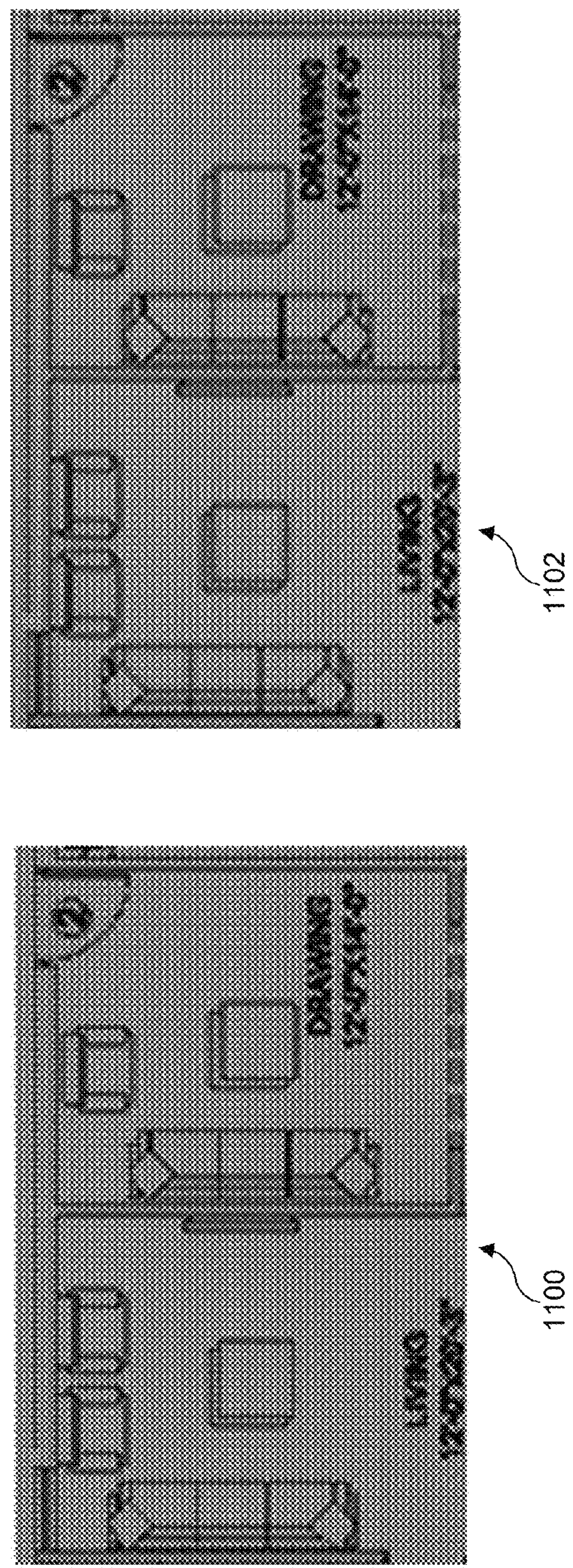
Figure 12:
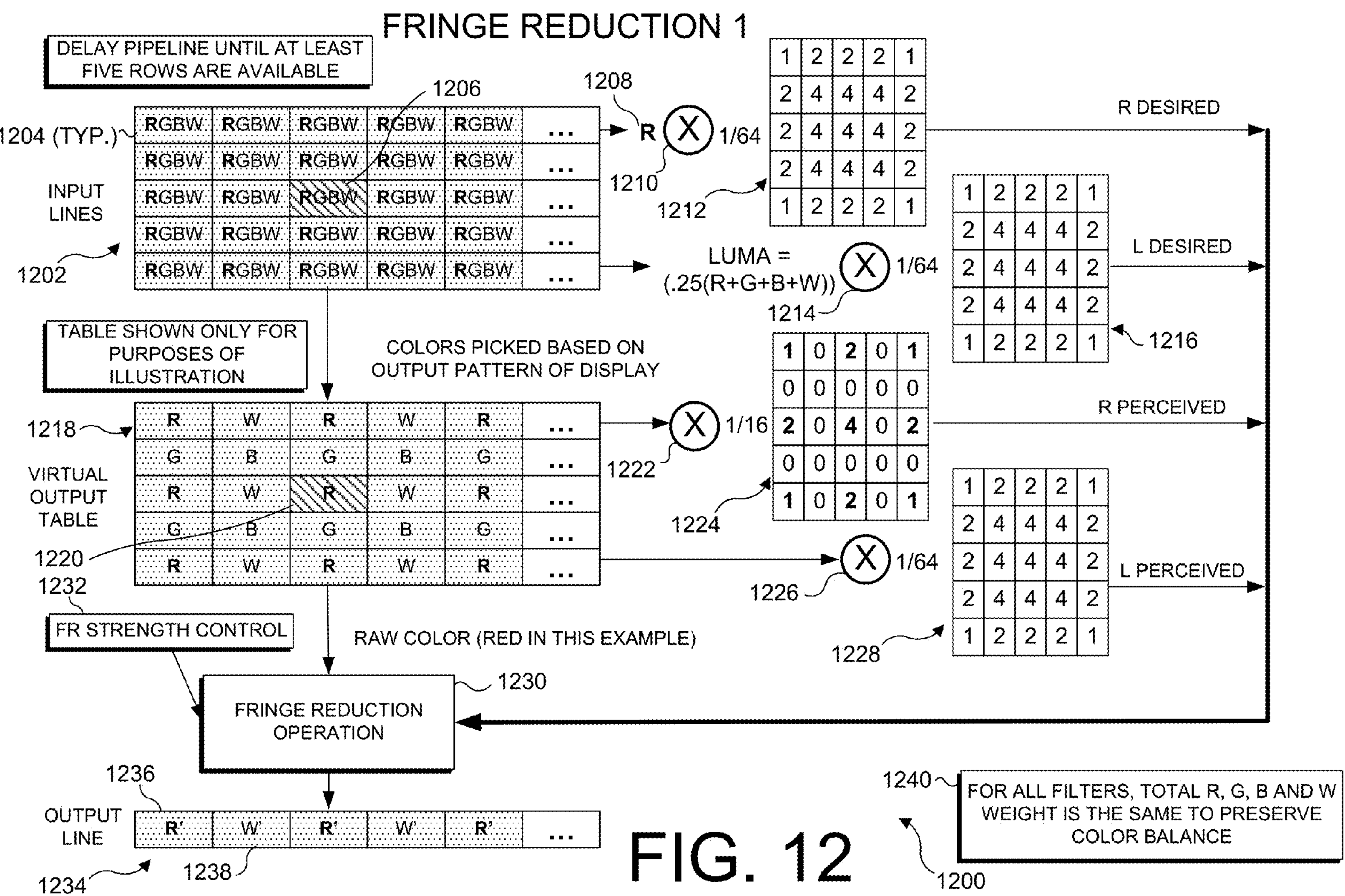
Figure 14:
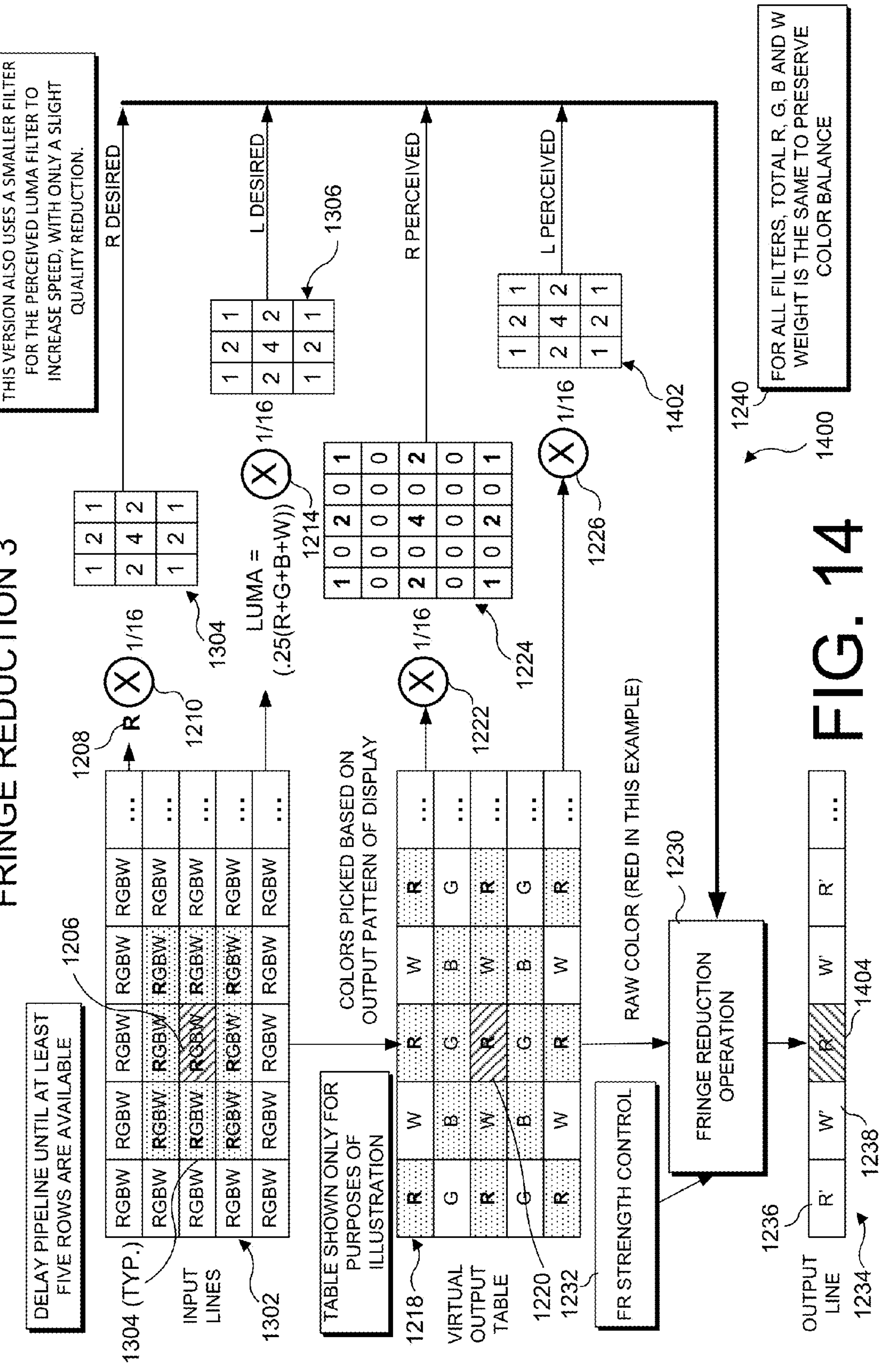
Figure 15C:
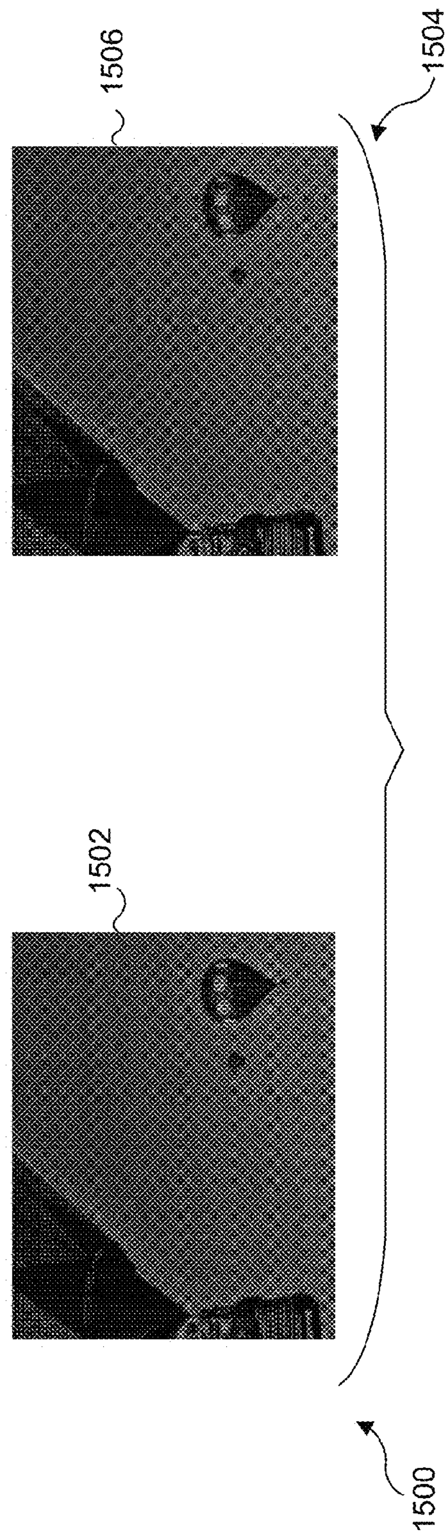
Figure 16:
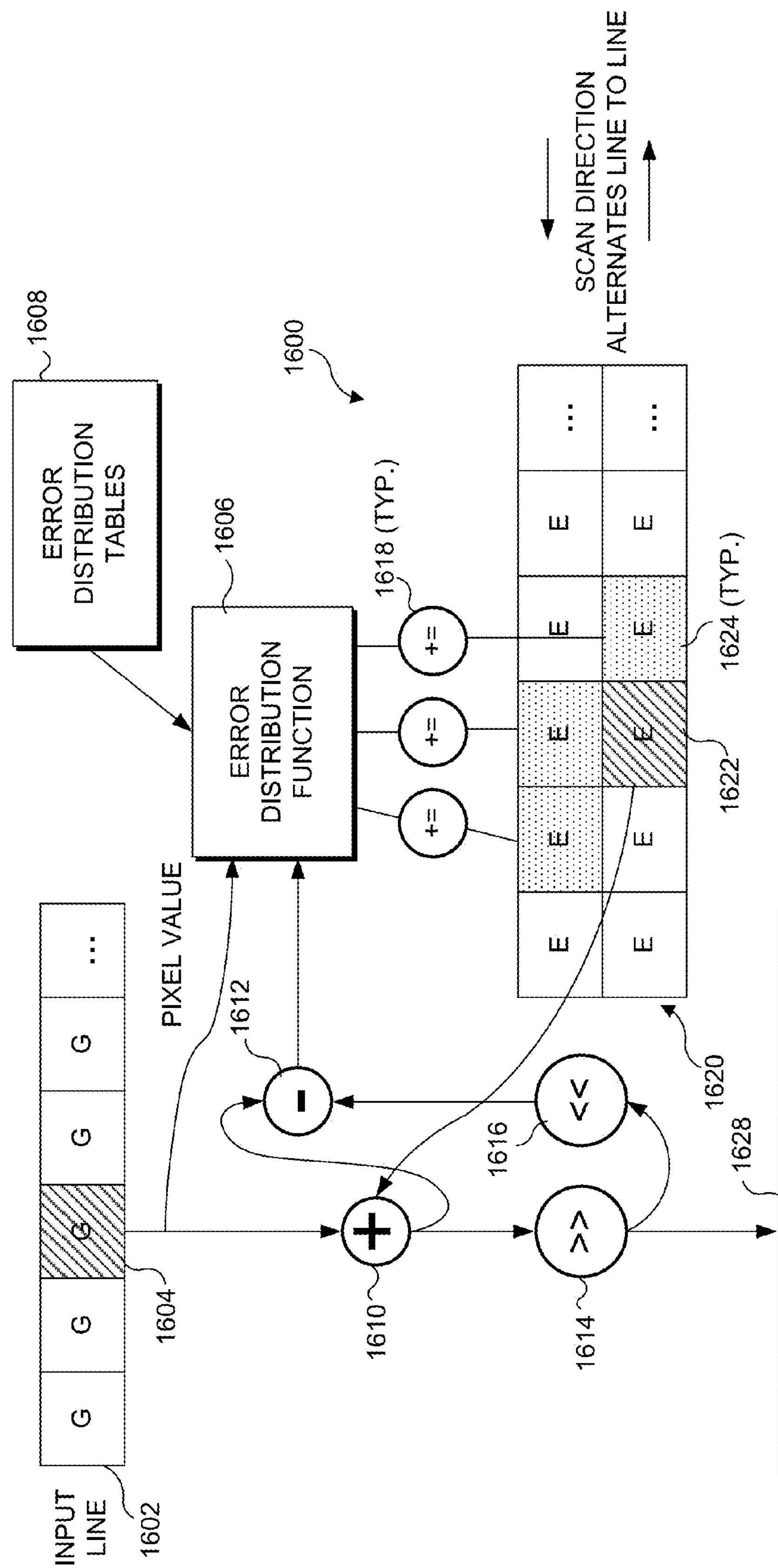
Figure 17:
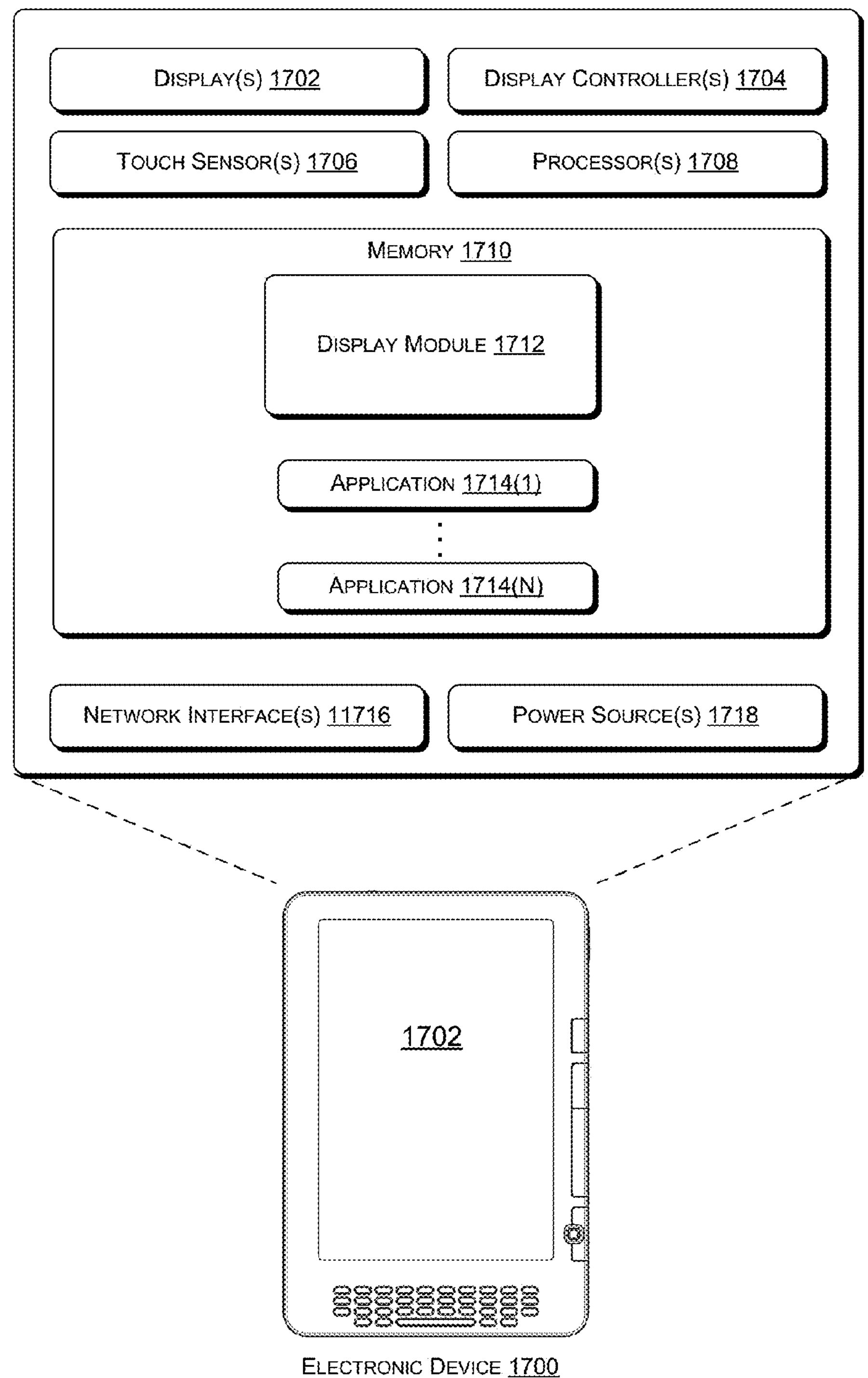

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1A is a schematic display showing the relative light intensity or brightness of a single pixel of an electrophoretic display in which a color filter overlies a pixel of an EPD, and also showing a set of red, green, blue, white (RGBW) pixels comprising the color components of an illustrative electrophoretic display;

FIG. 1B (grayscale) is an illustrative image as it appears on an RGBW electrophoretic display, as an example of the relatively low contrast of such images, particularly when viewed indoors under lower ambient light conditions (note that on an EPD, black does not appear as dark as on an LCD, and Brightness is relatively low when the EPD is viewed indoors, because the perceived contrast is lower);

FIG. 1C is a color image corresponding to FIG. 1B;

FIG. 2A is a schematic diagram showing a comparison between a color LCD in which each pixel comprises RGB subcomponents (i.e., three subpixels for each pixel), and an RGBW EPD in which a separate pixel is used for each of the RGBW color components;

FIG. 2B is a schematic illustration explaining why the RGBW pixels of an electrophoretic color display lack contrast, i.e., white pixels don't contribute to color, color fill factor is usually <100%, black still reflects some white light, and there is a limited range of brightness indoors;

FIG. 3A (grayscale) shows an example of color fringing near fine text and along the fine lines comprising an alphanumeric character in an illustrative EPD image;

FIG. 3B (grayscale) shows an example of color banding in an EPD image for a display having 16 color levels per pixel (note that a corresponding grayscale image is provided in this and other Figures), wherein banding is visible in regions with continuous gradients and is the result of e-ink only having 16 shades of gray per pixel;

FIG. 3C is a color image corresponding to FIG. 3A;

FIG. 3D is a color image corresponding to FIG. 3B;

FIG. 4 is a schematic block diagram showing an illustrative pipeline for enhancement processing of an RGB image to produce an improved corresponding RGBW mosaic image;

FIG. 5A (grayscale) shows contrast enhancement for an illustrative image with color components having 254 levels;

FIG. 5B is a color version of the images of FIG. 5A;

FIG. 6 is a schematic block diagram showing illustrative logic to achieve the contrast enhancement of an input image;

FIG. 7A (grayscale) shows color downsampling applied to an illustrative image to reduce color resolution by a factor of two, while preserving luminance for each pixel of the image;

FIG. 7B is a color version of the images of FIG. 7A;

FIG. 8 is a schematic block diagram showing illustrative logic for implementing color downsampling like that provided for the input image of FIG. 7;

FIG. 9A (grayscale) shows saturation boost for an illustrative image, which increases the difference between the lowest and highest color component;

FIG. 9B is a color version of the images of FIG. 9A;

FIG. 10 is a schematic block diagram showing illustrative logic for providing saturation enhancement;

FIG. 11A (grayscale) shows fringe reduction for an illustrative image;

FIG. 11B is a color version of the images of FIG. 11A;

FIG. 12 is a schematic block diagram showing illustrative logic for a first approach used for fringe reduction;

FIG. 13 is a schematic block diagram showing illustrative logic for a second approach used for fringe reduction;

FIG. 14 is a schematic block diagram showing illustrative logic for a third approach used for fringe reduction;

FIG. 15A (grayscale) shows how dithering is used to diffuse an error to nearby pixels, treating an entire image as grayscale, to smooth color transitions of gradient areas in an illustrative image;

FIG. 15B illustrates a standard error diffusion pattern (on the right side of the Figure) and a "blue noise" optimized (on the left side of the Figure), either of which can be used to provide dithering error diffusion;

FIG. 15C is a color version of the images of FIG. 15A;

FIG. 16 is a schematic block diagram showing illustrative logic for dithering an image; and FIG. 17 is a schematic functional block diagram showing illustrative components of an electronic device, such as an eBook reader, on which the present approach can be implemented.

DETAILED DESCRIPTION

Overview

Electronic paper displays (EPDs), which are often used on electronic book (eBook) readers and other types of portable electronic devices, produce an image that can readily be viewed using reflected ambient light. The EPDs use much less electrical power than displays that emit light, such as liquid crystal displays (LCDs), because power is applied to initially produce an image, and the image thus rendered is stable and is retained on the display without the need for refreshing it. Examples of the types of EPDs currently in use include electrophoretic, electrowetting, electrofluidic, and interferometric modulator displays, to name a few. Because EPDs are not backlit, they are readily viewed in very bright ambient light, such as direct sunlight. However, when viewed with lower levels of ambient light, as may be the case indoors, the resulting image can appear to be lacking in brightness.

Each pixel of a typical EPD can be controlled to produce shades of gray, e.g., 16 shades. Color images can be produced on electronic paper displays by overlying each pixel of the display with either a red, a green, or a blue filter. Unlike LCD color images, wherein each pixel of the image comprises all three red, green, and blue subpixels, an image on a color EPD typically has only one color per pixel. As shown in FIG. 1A, a pixel 100 of a color EPD has a brightness of only about 12%, since an underlying grayscale pixel 102 has a brightness of about 40%, and an overlying color filter 104 reduces the brightness by about 30%. Thus, color EPDs with only red, green, and blue pixels exhibit a low brightness, even in relatively bright ambient light. To improve the brightness of a color EPD, a white pixel 112 is often added to each set of a red pixel 106, a green pixel 108, and a blue pixel 110. The resulting set of pixels produces a brightness that is about 20%, which is about 66% brighter than an EPD having sets of the red, green, and blue pixels.

Even though an EPD with RGBW pixels appears brighter than one with just RGB pixels, black does not appear as dark on such an EPD as it does on an LCD. FIG. 1B shows an illustrative image 114 as it appears on a color EPD, but in grayscale rendering, while FIG. 1C shows the corresponding image in color. It will be apparent that blacks are not very dark in illustrative image 114. Further, when image 114 is viewed indoors on the color EPD, its brightness is relatively low, because the perceived contrast is lower than a LCD or other light emitting type of display.

FIG. 2A illustrates another problem with an RGBW EPD 212 in contrast to an LCD 200. As noted above, each pixel 210 of LCD 200 includes a red subpixel 202, a green subpixel 204, and a blue subpixel 206. In EPD 212, a red pixel 214, a white pixel 216, a green pixel 218, and a blue pixel 220 together comprise a set 222 of color components. Since only a single pixel 222 is employed for each color of set 222, the resolution of EPD 212 is one-fourth less than that of LCD 200 if both types of displays have the same number of pixels. Another problem with the RGBW pixels of an EPD color display is the low saturation that the EPD exhibits, which is shown for set 222 of RGBW pixels 224 in FIG. 2B. In this example, white pixel 216 does not contribute to the color of set 222, and as illustrated by color filter 226 for red pixel 214, the filters for each different color pixel do not cover all of the area of the underlying grayscale pixel, so that the color fill factor is generally less than 100%. Also, the black produced by the color EPD is not a dark black and still reflects some light. Thus, the color EPD has a limited range of brightness indoors.

Color fringing occurs in an EPD color display, as shown by an illustrative image 300 in FIG. 3A (and the corresponding color version in FIG. 3C). Image 300 is of a letter "K" 310 and comprises plurality of red pixels 302, green pixels 304, blue pixels 306, and white pixels 308. Color fringing 312 is visible near horizontal and vertical edges of the letter K, and more generally, near fine text and fine lines of elements in a color EPD image. Color fringing is less of a problem for large font characters of text or thick lines, since the relative size of the color fringing compared to the area along which it occurs is then much less. It should be noted that color fringing is not limited to EPD images, but can occur in images formed on other types of displays. Accordingly, a technique like the illustrative procedures disclosed herein for reducing the color fringing in an color EPD can also be beneficial in reducing color fringing in other types of displays.

Because of the limited range of colors available on a typical color EPD, an image produced thereon can exhibit color banding. For example, an illustrative image 314 is shown in grayscale in FIG. 3B, and in the corresponding color version in FIG. 3D. In this image, bands 316 and 318 are examples of this problem in regions with continuous gradients. The banding occurs in an EPD color image such as this, because there are only 16 shades of gray per pixel, and the limited range of colors does not permit a continuous shading to properly portray the gradient.

In a typical approach to address problems with output image quality as noted above, an input image would be processed to correct a first of the problems, and the corrected image would be stored in memory. Next, another procedure would be carried out on the corrected image to address a different problem, producing yet another corrected image. For each successive procedure, more memory would be required to improve the corrected image resulting from a previous procedure. However, many portable electronic devices have a limited memory and would be unable to store all of the intermediate corrected images produced by successively carrying out different procedures to improve the color image ultimately rendered on a color EPD.

FIG. 4 illustrates a flowchart 400 showing illustrative logic for enabling an electronic device with limited memory to implement a plurality of corrective procedures for addressing limitations of color EPD or other type of display, by implementing the procedures within a pipeline. As indicated in this specific example, a color input image defined by RGB data at a resolution of 1024×768 pixels is processed in the pipeline so that successive lines (i.e., rows of pixels) of the input image are input and processed to implement each of a plurality of procedures that improve a quality of a color output image that will be rendered as an RGBW mosaic image at a resolution of 1024×768 pixels on a EPD. The resolution of the input and output images is simply intended to be illustrative and not limiting, since almost any resolution can be employed.

The first procedure executed on successive lines of input image 402 is contrast enhancement, as indicated in a block 404. A block 406 indicates that the next procedure executed on the result of the processing in block 404 is color downsampling. The result of the color downsampling procedure implemented on successive lines is input to a block 408, which provides a saturation boost. The result of the color downsampling is then input for fringe reduction, which is implemented in a block 410. A block 412 provides for dithering lines that were processed for fringe reduction, to reduce color banding. Finally, the output of the dithering procedure is used for rendering an RGBW mosaic 1024×768 pixel image 414.

For some types of images, a background input image might be processed through the pipeline, while a layer overlying the background image, for example, a layer that comprises relatively large fonts or other graphic elements that do not exhibit quality issues in the rendered RGBW mosaic image can be rendered without being processed through the pipeline. Alternatively, only a selected one or more of the enhancement procedures might be applied within the pipeline to process overlying graphic elements, since the other procedures might provide too little benefit to be applied. For example, fringe reduction is typically not necessary for large fonts that are rendered, since the color fringing is so much less evident on larger font characters.

Further, some images might be more speedily rendered if the input image data are preprocessed before the output mosaic image data must be rendered on the display of the electronic device. The resulting output RGBW mosaic image data can then be stored until it is necessary to render the image, enabling the output image to rendered more rapidly.

It must be emphasized that the order in which the procedures are executed in the pipeline can be different than that shown in the illustrative embodiment of FIG. 4. Accordingly, it will be understood that the order of the procedures can be varied from that shown in this example, within the scope of the claims that follow.

Illustrative Image Enhancement Procedures

FIG. 5A (and FIG. 5B) show an illustrative input image 502. To improve the contrast of input image 502, a "gamma like" correction curve, such as a curve 504 is applied separately to each of the red, green, and blue components, for each pixel of input image 502, producing an output image 506. For a given level of a color component in input image 502, curve 504 indicates the correction that is applied to produce the output level that is used in output image 506. The correction for each RGB color component for each pixel of the input image can be provided in a lookup array, for example, although other approaches can be implemented instead, as will be evident to those of ordinary skill in this art. It will be evident that the contrast enhancement provided in output image 506 relative to input image 502 is much more evident in the color versions of these two images shown in FIG. 5B, compared to the corresponding grayscale versions shown in FIG. 5A.

The advantage of using the pipeline for implementing successive procedures to enhance the quality of the image that is ultimately rendered on color EPD is that the pipeline can iteratively process a few lines of the input image through the successive different procedures in a stream, which avoids the need to store intermediate full output images after each different procedure is completed. As shown by the illustrative logic in a schematic block diagram 600 of FIG. 6, contrast enhancement is implemented on an input line 602, by processing each pixel 604. Successive pixels in the input line are processed by looking up the increase in color component levels for each RGB component 606 of the pixel. Lookup tables 608 specify predetermined increases in these color components levels (such as those shown for illustrative curve 504 in FIG. 5A/5B) as a function of the level of the color component in the pixel. These increases are then added to the input levels of the RGB color components. The resulting enhanced color components are stored in an output line 610, for each pixel 612 of the output line.

FIG. 7A (and FIG. 7B) show an example 700 of an illustrative input image 702 that is processed by a color downsampling procedure 704, to reduce the color resolution of the input image by a factor of two, producing an output image 706. Again, the change in the color resolution of these images is much more visually evident when viewed in color in FIG. 7B than in the corresponding grayscale images of FIG. 7A. The color downsampling procedure preserves the luminance of each pixel, even though the color resolution is halved.

Illustrative logic for implementing color downsampling procedure 704 in the pipeline is shown in FIG. 8. In this example, the color downsampling of each pixel of an input image (e.g., pixels in the output lines from the contrast enhancement procedure of FIG. 6) is based on RGB color component data for a current pixel 804, and for eight pixels 802 that surround the current pixel and which are disposed in adjacent rows and columns. Accordingly, processing for procedure 704 is delayed until three input lines 800 are available in the pipeline. For color downsampling current pixel 804, a block 806 indicates that luma values 808 are separated from the RGB color components of current pixel 804 and surrounding pixels 802, yielding various luma values 810 for the surrounding pixels and a luma value 812 for current pixel 804. For a given pixel, the luma value for the pixel is equal to a weighted average of the RGB color components of the pixel. The luma values of each of surround pixels 802 are separately subtracted from each of the RGB color components of the pixel, yielding various R'G'B' color difference values 816 for each of surrounding pixels 802, and R'G'B' color difference values 818 for current pixel 804. The color difference values are loaded into a temporary color difference storage 814 for the three lines in which current pixel 802 is in the center line or row. Next, each of the separate R'G'B' color difference values for the surrounding pixels and for the current pixel are convolved with a blur filter 820 in a convolution process 822, using a blur strength control 824 that determines the extent of blurring in the color downsampling procedure. The convolution procedure, which involves 18 multiply-adds, also involves normalizing the values by multiplying by the inverse of their sum (which is 1/16 in the example given). The results of the convolution process for each of the color difference color components in each of the surrounding pixels and in the current pixel are then added to the corresponding luma for those respective pixels in an add procedure 826, yielding an output line 828 that includes a downsampled current pixel 830. Because this downsampling procedure 704 requires one extra line above and one extra line below to perform a convolution, the top of the input image is padded with a copy of the top row of pixels, and the bottom of the input image is padded with a copy of the bottom row of pixels before feeding into the pipeline. Similarly the left and right sides of the image are respectively padded with copies of the left and right columns of pixels.

FIG. 9A (and FIG. 9B) show an illustrative input image 900 and a corresponding image 902 in which saturation has been boosted. The process of boosting saturation of an image increases a difference between a lowest level color component and a highest level color component, for each of the pixels in the image. The effect of saturation boosting is more visually evident in the color version of the images shown in FIG. 9B than in the grayscale versions of images 900 and 902 that are shown in FIG. 9A.

FIG. 10 is a schematic block diagram 1000 showing illustrative logic for saturation enhancement of an image. An input line 1002 includes a current pixel 1004 for which the procedure is being applied to boost saturation. Each of the pixels in input line 1002 are defined by RGB color component data. A block 1006 indicates that a saturation enhancement operation is implemented for current pixel 1004 using a saturation enhancement control 1008. A resulting saturation enhanced current pixel 1012 comprising RGBW color component data is provided to an output line 1010. The saturation enhancement operation thus both boosts saturation of the input pixels, and converts the input pixels from RGB color components to RGBW color components, by adding the white color component to the data used in the output line.

The details for the saturation enhancement operation in this illustrative embodiment include computing a difference color, DIFF, and an average color, AVG, for current pixel 1004 being processed, as follows.

$$\mathrm{DIFF}=\mathrm{MAX}(R,G,B)-\mathrm{MIN}(R,G,B) \quad (1)$$

$$\mathrm{AVG}=\mathrm{AVG}(\mathrm{MAX}(R,G,B),\mathrm{MIN}(R,G,B)) \quad (2)$$

In Eq. (1), MAX(R,G,B) is the maximum value of the three color components, and MIN(R,G,B) is the minimum value, while AVG is the average of the MAX(R,G,B) and MIN(R, G,B) values. To boost the color saturation, producing R', G', and B' color components, the value of each separate color component of the current pixel is increased as follows:

$$R'=((R-\mathrm{AVG})*\mathrm{DIFF}*\mathrm{BOOST})+\mathrm{AVG}$$

$$G'=((G-\mathrm{AVG})*\mathrm{DIFF}*\mathrm{BOOST})+\mathrm{AVG}$$

$$B'=((B-\mathrm{AVG})*\mathrm{DIFF}*\mathrm{BOOST})+\mathrm{AVG} \quad (3)$$

In the preceding equations, BOOST is a predefined constant that determines the amount of color boost applied to each of the RGB color components.

Finally, the value of the new white color component, W, is computed as follows.

$$W=((\mathrm{MIN}(R,G,B)-\mathrm{AVG})*\mathrm{DIFF}*\mathrm{BOOST})+\mathrm{AVG} \quad (4)$$

FIG. 11A (and FIG. 11B) shows an RGBW image 1100 (such as is produced by the saturation boost procedure discussed above) that includes color fringing. The color fringing is more evident in the color version of RGBW image 1100 shown in FIG. 11B than in the corresponding grayscale image shown in FIG. 11A. These Figures also show a corresponding RGBW mosaic color image 1102 in which the color fringing is reduced. The intent of the color fringing reduction is to match a perceived color of RGBW image 1102 to the color of the RGBW image that was produced as a result of the saturation boost discussed above in connection with FIG. 10.

Three different illustrative embodiments are disclosed below for implementing the fringe reduction in the output mosaic RGBW image data. FIG. 12 is a schematic block diagram showing logic for a first illustrative embodiment of a fringe reduction procedure 1200. Because the procedure uses color component data for the pixel currently being processed in a current row, and for adjacent pixels in two rows above the current row and two rows below the current row, processing of the first pixel in the pipeline is delayed until at least five rows 1202 of RGBW data for an input image are available in the pipeline. Similar to the downsampling procedure 704, the fringe reduction procedure 1200, requires two extra lines above and two extra lines below to perform a fringe reduction operation on a row. Thus, the top of the input image is padded with two copies of the top row of pixels, and the bottom of the input image is padded with two copies of the bottom row of pixels before feeding into the pipeline. Similarly the left and right sides of the image are respectively padded with two copies of the left and right columns of pixels. In this example, 24 adjacent pixels of color component data, and the color component data for a current pixel 1206 being processed are employed to determine the separate values for each of the RGBW pixels of an output mosaic color image. This procedure for fringe reduction involves computing separate values for a desired luma, a perceived luma, and for each color component, R, G, B, and W, a desired color component value, and a perceived color component value. In regard to the three illustrative embodiments for reducing fringing that are discussed herein, the color component for which the desired value and perceived value are computed in these Figures is the red color component; however, it will be understood that the desired and perceived values for the other color components, i.e., for the green, blue, and white color components are similarly computed.

To compute the desired red component value of current pixel 1206, the red values from each of adjacent pixels 1204 and from current pixel 1206 are multiplied (or convolved) as indicated by a symbol 1210 using a 5×5 array of predefined values 1212 as a convolution filter or convolution kernel, and multiplying by a compensation value of 1/64. (Note—the 5×5 array of predefined values 1212 can be alternatively referred to as a convolution filter or as a convolution kernel.) It is important to understand that the values included in each of the convolution filters or convolution kernels used in all three of the illustrative embodiments for reducing fringing discussed herein are specifically selected to preserve the color balance for each of the color components of the pixels in the output mosaic color image.

A desired luma for current pixel 1206 is computed by determining a LUMA value for each of adjacent pixels 1204 and for current pixel 1206 and multiplying or convolving the values thus determined for the LUMA, as indicated by a symbol 1214, using a 5×5 array of predefined values 1216 as a convolution filter, and multiplying by a compensation factor of 1/64. The LUMA for each of adjacent pixels 1204 and for current pixel 1206 can be computed in accord with the following expression.

$$\mathrm{LUMA}=(0.25(R+G+B+W)) \quad (5)$$

In this expression, the values for LUMA determined for each of adjacent pixels 1204 and for current pixel 1206 depends on the values of the red, green, blue, and white color components of the pixel. It will be understood that the LUMA for each of the adjacent pixels and for the current pixel is then multiplied or convolved using 5×5 array 1216 as a convolution filter to determine the desired luma for current pixel 1206.

For computing each of the perceived color components and the perceived luma, a temporary virtual output table 1218 can be employed. It will be understood that virtual output table 1218 is only shown for purposes of illustration, since the values included in it can simply be extracted from rows 1202. Also, the disposition of the color components in virtual output table 1218 actually depends on the pattern of color component pixels in the mosaic pattern used in the display on which the final output image will be rendered. In this example, for each set of color components in the mosaic pattern used on the display, red and white pixels are next to each other on the same row, with red on the left side and white on the right side, and the green and blue color components are disposed immediately below the red and whit color components respectively, in the next row. However, the display used to render the mosaic color image may alternative mosaic patterns for laying out the four color components, for example, positioning the red and green color pixels on the same line, with the white and blue pixels on the next line.

In virtual output table 1218, a current pixel 1220 is centered among the pixels of other color components, over a 5×5 pixel area. When the perceived color value is being computed for the other color components of current pixel 1206, the perceived color component value then being computed would be computed using a similar pattern, but with the current color component in the central position of the virtual output table.

Using the color values for virtual output table 1218, as indicated by a symbol 1222, the perceived red value for current pixel 1206 is computed by multiplying or convolving the values in virtual output table 1218 using a 5×5 array of predefined values 1224 as a convolution filter. It will be noted that 5×5 array of predefined values 1224 includes 16 non-zero values. Accordingly, compensation is provided by multiplying the product or convolution result by 1/16, to produce the value for the red perceived color. Similarly, as indicated by a symbol 1226, the color values in the virtual output table 1218 are multiplied or convolved using a 5×5 array of predefined values 1228, and compensated by multiplying by 1/64, to produce the perceived luma for current pixel 1206.

Next, as indicated by a block 1230, the values computed for the desired color component, the desired luma, the perceived color component, and the perceived luma are employed for the fringe reduction operation, which is controlled based on a predefined fringe reduction strength control value, as noted in a block 1232. The result of the fringe reduction operation is included in an output line 1234 (which in this example, includes red fringe reduced color components 1236, and white fringe reduced components 1238). As a result of the fringe reduction operation in block 1230, two lines are lost, since now, each pixel in the output used for rendering the mosaic color image is used for a separate color component. As stated in a block 1240, for all of the color reduction filtering applied to each of the color components in a pixel that is input to the procedure, a total R, G, B, and W weight is the same as in the mosaic output image. To achieve this result, the values in each array of color values 1212, 1216, 1224, and 1228 are specifically selected so that the color balance of the image is preserved.

The fringe reduction operation performed in block 1230 involves two steps for each color component in this illustrative embodiment and in each of the remaining two alternative embodiments for fringe reduction discussed below. In the first step, an error value, E, is computed for the color component being determined for current pixel 1206, in accord with the following equation.

$$E=\text{perceived color}-\text{desired color}*(\text{perceived luma}/\text{desired luma}) \quad (6)$$

Next, an adjusted color value is computed for each color component of the current pixel, using a raw color of that color component from current pixel 1220 in virtual output table 1218, as follows.

$$\text{Color}=\text{Raw Color Value}-E*\text{FR} \quad (7)$$

In Eq. (7), FR is the fringe reduction strength control value.

It will be understood that the green, blue, and white fringe reduced color components for current pixel 1206 are computed in a similar manner. Further, fringe reduced color components for all other pixels of the input image are successively computed in a similar manner, until data defining a full fringe reduced mosaic color image have been obtained.

A second illustrative embodiment 1300 for the fringe reduction procedure is shown in FIG. 13. Generally, much of this second illustrative embodiment that is shown in this Figure and of the third illustrative embodiment, which is shown in FIG. 14, is the same as that of the first illustrative embodiment for implementing fringe reduction. Accordingly, the same reference numbers are used for elements of the second and third illustrative embodiments that are the same as in the first illustrative embodiment for fringe reduction, and only the elements that are different are discussed below. Similarly, elements that are the same in the third illustrative embodiment as in the second illustrative embodiment are also used in FIG. 14.

One difference between the first and second illustrative embodiments arises because the second illustrative embodiment of FIG. 13 uses input lines 1302 and employs adjacent pixel 1304 in a 3×3 array of pixels centered around current pixel 1206. The next difference between the first and second illustrative embodiments for fringe reduction involves the use of a 3×3 array of predefined values 1306 that is used for the multiplication or convolution of the current color components of adjacent pixels 1304 and current pixel 1206 to compute the desired color values for the current color pixel. Because 3×3 array of predefined values 1306 is smaller in dimension than the 5×5 arrays of the first illustrative embodiment, compensation is now provided by a 1/16 multiplier, instead of by a 1/64 multiplier. Similarly, in the second illustrative embodiment, the desired luma for current pixel 1206 is determined by multiplying or convolving the LUMA values determined as noted above in Eq. (5) by a 3×3 array of predefined values 1308. The desired color and perceived color for each of the color components, and the desired luma and perceived luma of current pixel 1206 are then input to the fringe reduction operation implemented of block 1230 and are used to compute the output fringe reduced color values for the color mosaic output image that will be rendered.

The benefit of using smaller arrays 1306 and 1308 as convolution filters for determining the desired color components and the desired luma for the current pixel is that the number of computational operations is reduced, which increases the speed at which these values are determined and improves the sharpness of the output mosaic color image.

FIG. 14 shows details of a third illustrative embodiment 1400 for fringe reduction in a mosaic RGBW color image that is rendered on a display. The only difference between the third illustrative embodiment of this Figure and the second illustrative embodiment 1300 of FIG. 13 is that in the third illustrative embodiment, the perceived luma for current pixel 1206 is computed using a 3×3 array of predefined values 1402 for multiplying or convolving the values of virtual output table 1218. Note that only the inner 3×3 region of values from input lines 1302 is convolved in this illustrative embodiment. However, five lines must be input because the second step for computing perceived color still requires a 5×5 region. Setting the elements of the 5×5 matrix that are outside the inner 3×3 matrix to zero speeds up the computation. In all other respects, the third illustrative embodiment implemented in FIG. 14 to produce a fringe reduced color component values (e.g., a fringe reduced red color component 1404) is identical to that of FIG. 13.

The reduction in color banding of an output image that can be achieved in images having a relatively limited color resolution is evident in the grayscale image of FIG. 15A, and even more so in the color version shown in FIG. 15C. An example 1504 showing an input image 1502 having color banding in gradient areas is corrected by using dithering, producing an image 1506 with substantially reduced color banding. The dithering diffuses the errors in the transitions between color bands to nearby pixels. These errors arise because of a reduced color resolution in the output image.

The entire input image is treated as comprising grayscale pixels in this illustrative procedure. The pixels that are nearby a current pixel that is being dithered to diffuse the error can be selected according to different patterns, and using any of a number of different well-known error diffusion algorithms. Two such patterns are shown in FIG. 15B. A standard error diffusion pattern 1508 is used in the well-known Floyd-Steinberg diffusion algorithm. This algorithm compares an input signal intensity level to a fixed threshold and generates an output binary signal according to the results of this comparison. A quantization error corresponding to the difference between the input and the output signals is distributed to the neighboring pixels of the pixel currently being processed using distribution coefficients. For example, the distribution coefficients can include the following values: 7/16 for a next pixel in the same line as the current pixel, 3/16 for a pixel in a next line but one column before the column of the current pixel, 5/16 for the pixel in the next line and immediately below the current pixel, and 1/16 for the pixel in the next line and in the next column following that of the current pixel. In contrast, the "blue noise" optimized algorithm uses pattern 1510. The term "blue noise" is applied here, because the output of this error distribution algorithm has a Fourier spectrum that is radially symmetric and does not possess energy at low frequencies, which is desirable. Both patterns 1508 and 15010 are dependent on the direction in which successive pixels are being processed (i.e., from left to right in these examples). In pattern 1508, a current pixel being processed is at an origin $N_{00}$ and the distribution coefficients noted above are associated with adjacent pixels at relative coordinates positions: $N_{10}$, $N_{-11}$, $N_{01}$, and $N_{11}$, respectively. In pattern 1510, the error is distributed to only three pixels, relative to the current pixel being processed, i.e., to pixels $N_{10}$, $N_{-11}$, and $N_{01}$.

FIG. 16 shows details of an illustrative dithering procedure 1600 used to diffuse the errors at each pixel in an image to smooth color transitions. In this illustrative procedure, an input line 1602 is taken from the previous stage that was processed in the pipeline. It will be recalled that each pixel produced by the color fringe reduction is a separate color component. However, in dithering procedure 1600, each pixel in input line 1602 is treated as an eight bit value (i.e., a grayscale value from 0-255). Thus, a red pixel having a value of 154 would be treated as pixel having a grayscale value of 154. Each pixel in input line 1602 is used to determine an error that is diffused to its three neighbors, with the error being distributed to specific neighboring pixels according to pattern 1510 of FIG. 15B. A current pixel 1604 is being processed in this example. The eight bit pixel value for current pixel 1604 is input to a block 1606, which implements an error distribution function, and to an adder 1610, which adds an error from an error accumulation buffer 1620, i.e., an error 1622 from the error accumulation buffer for the current line being processed. The bottom row of error accumulation buffer 1620 includes errors that will be propagated to the pixels of the current input line being processed, e.g., input 1602 in this example, and the top row of the error accumulation buffer includes errors that will propagate to the next line that is input (e.g., the line following input line 1602 in this example). The bits comprising the sum resulting from adding error 1622 to the grayscale value of current pixel 1604 is then shifted to the right in a block 1614. For this example, the sum is shifted four bits to the right, since the input grayscale value is eight bits, but the output is rendered on a display for the output pixel using only four bits per pixel value. It will be appreciated that the number of bits shifted to the right can differ from this example, if the input grayscale value is different, or if the output pixels are rendered with a different number of bits of color resolution. The sum is stored as a dithered grayscale pixel value for a pixel 1628 in an output line 1626. To determine the error that was generated because of the bits of the sum being shifted to the right (which causes bits of grayscale resolution to be lost), the value stored in pixel 1628 is shifted to the left by the same number of bits in a block 1616. In this example, a four bit shift is carried out, yielding an eight bit value. The result of the bit shift to the left is then subtracted from the original sum (i.e., before the bit shift to the right that occurred in block 1614) in a block 1612. The difference is equal to the value of the bits that were lost by the bit shift to the right in block 1614, which is the error resulting from the reduction in grayscale resolution. The resulting difference, or error value, is input to the error distribution function in block 1606.

Based on the grayscale pixel value of current pixel 1604 that was input to the error distribution function in block 1606, error distribution tables 1608 are accessed to determine how the error that was determined by the subtraction in block 1612 should be propagated to each of the three designated neighboring pixels of pixel 1622. The neighboring pixels of pixel 1622 correspond to those in pattern 1510 (FIG. 15B), but the pattern is vertically inverted in this illustration, since new lines are entered into error accumulation buffer 1620 at the top, the previous bottom line in the error accumulation buffer is discarded, and previous top line becomes the bottom line when processing on each new input line begins. It should also be noted that the scan direction in error accumulation buffer 1620 alternates from line to line in a serpentine manner, and that the pattern (i.e., pattern 1510 of FIG. 15B) of neighboring pixels flips horizontally each time that the scan direction alternates As indicated by add symbols 1618, the values determined by error distribution tables 1608 for distributing the error input from the subtraction in block 1612 (which are based on the grayscale pixel value that was input to the error distribution function) are added to the respective neighboring pixels 1624 of pixel 1622, to produce the distributed error values stored in the error accumulation buffer. It will be apparent that for the next current pixel in input line 1602, the error just distributed to pixel 1624 (to the right of pixel 1622) will be added to the original grayscale pixel value of the next current pixel in input line 1602. In this manner, the error distributed to neighboring pixels in error accumulation buffer 1620 continues to propagate as new current pixels in successive input lines are processed by dithering procedure 1600. When processing of the input data used for each of the successive input lines is complete, the dithered image can be rendered on a display, such as a color EDP electrophoretic display, and banding at color transitions will be greatly reduced as a result of implementing dithering procedure 1600.

Boundary Conditions

Several of the illustrative embodiments for procedures that can be implemented in the pipeline discussed above require that a plurality of lines be available in the pipeline before an initial pixel is processed. These procedures are color downsampling procedure 704 discussed above in connection with FIGS. 7 and 8, and the three fringe reduction procedures 1200, 1300, and 1400, discussed respectively in connection with FIGS. 12, 13, and 14. Before processing of a first pixel value in any of these procedures are initiated, the input data are modified to "prime" the pipeline by adding three copies of the first row or line of pixels of the input image data before the first row, three copies of the last line or row of pixels of the input image data after the last row or line, three copies of the pixels on the left side of the input image data to the left of the first column of pixels, and three copies of the pixels on the right side of the input image data to the right the of the input image. The additional pixels that are thus added to the image data being processed increase the nominal size of the input image, but provide the added adjacent pixel data needed to process pixels in the input image data borders. The copies of the pixels in the input image data that are thus added do not otherwise affect the output image produced by the pipeline.

Illustrative Architecture

FIG. 17 shows an illustrative electronic device 1700 configured to implement the techniques described above. While FIG. 17 illustrates electronic device 1700 as a dedicated eBook reading device, in other implementations, electronic device 1700 may comprise any other type of mobile electronic device (e.g., a laptop computer, a tablet computing device, a multifunction communication device, a smartphone or other type of cellular telephone, a portable digital assistant (PDA), etc.) or non-mobile electronic device (e.g., a desktop computer, a television, etc.) that includes a display able to benefit from the techniques disclosed above. In addition, while electronic device 1700 is illustrated in FIG. 17 as including several functional components, it is to be appreciated that electronic device 1700 may also include other conventional functional components, such as an operating system, system busses, input/output components, and the like.

Regardless of the specific implementation of electronic device 1700, this example of the device includes one or more displays 1702 and corresponding display controller 1704. The one or more displays may represent EPDs, but may alternatively include LCDs, plasma displays, LED displays, and/or the like. As described above, illustrative embodiments are particularly useful in improving the quality of color electrophoretic e-ink displays, but are not limited to that type of display for rendering content on electronic device 1700.

As discussed above, EPDs represent an array of display technologies that largely mimic the look of ordinary ink on paper. In contrast to conventional backlit displays that use emitted light, EPDs typically reflect light to enable an image to be viewed, much as ordinary paper does. In addition, EPDs are typically bi-stable, meaning that these displays are capable of maintaining the displayed text or other rendered images, even when very little or no power is supplied to the display.

In one implementation, one or more displays 1702 comprise at least one color electrophoretic display that moves particles between different positions to achieve different color shades. For instance, in a pixel that is free from a color filter, the pixel may be configured to produce a white color when the particles within this pixel are disposed at the front (i.e., viewing) side of the display. When thus disposed, the particles reflect incident light, thus giving the appearance of a white pixel. Conversely, when the particles are moved toward the rear of the display, the particles absorb the incident light and cause the pixel to appear black to a viewing user. In addition, the particle may be disposed at varying positions between the front and rear sides of the display to produce varying shades of gray, e.g., 16 shades of gray.

Of course, while one example has been given, it is to be appreciated that the EPD may comprise other types of electronic paper technology, such as gyricon displays, electrowetting displays, electrofluidic displays, interferometric modulator displays, cholestric liquid crystal displays, and the like. In addition, while a pixel of the display may be employed for rendering a plurality of shades of gray, it is to be appreciated that color EPDs can render color pixels by overlying a pixel with a desired color filter, e.g., a red, green, or blue color filter, so that the shades of gray are converted to shades of color for the specific filter used. Further, it will be apparent that other color systems may be used besides RGB and RGBW, and that in such systems, corresponding alternative color filters may be employed instead of the RGB filters. Also, instead of using white pixels to increase the brightness of an EPD as in the RGBW system, a different color pixel can be used, such as yellow.

In addition to including the one or more displays 1702, FIG. 1 illustrates that electronic device 1700 may include one or more touch sensors 1706, although touch sensors are clearly not required to practice the techniques discussed above. In some instances, at least one touch sensor 1706 resides underneath or on top of a corresponding display 1702 to form a touch-sensitive display that is capable of both accepting user input and rendering content corresponding to the input. In other instances, electronic device 1700 may include a touch sensor that is adjacent to a display. It is to be appreciated that each of the techniques described herein may apply to instances where touch sensor 1706 and display 1702 form a touch-sensitive display and instances where touch sensor 1706 and display 1702 do not, as well as instances in which a touch sensor is not included in electronic device 1700.

If included in electronic device 1700, touch sensor 1706 may comprise a capacitive touch sensor, an interpolating force sensitive resistance (IFSR) sensor, or any other type of touch sensor. In some instances, touch sensor 1706 can be capable of detecting touches, as well as determining a magnitude of pressure or force of these touches. For instance, touch sensor 1706 may comprise an ISFR sensor resident behind an electronic paper display, such that a user is able to draw upon the display utilizing a writing instrument, e.g., a stylus, a finger of the user, or the like.

FIG. 17 further illustrates that electronic device 1700 includes one or more processors 1708 and a memory 1710, as well as one or more network interfaces 1716, and one or more power sources 1718. Network interfaces 1712 may support both wired and wireless connection to various networks, such as cellular networks, radio, Wi-Fi networks, short range networks (e.g., Bluetooth), IR, and so forth, but are not required to implement the image enhancement procedures discussed above.

Depending on the configuration of electronic device 1700, memory 1710 (and other memories—if included) is an example of computer storage media and may include volatile and nonvolatile memory. Thus, memory 1710 may include, but is not limited to, random access memory (RAM), read only memory (ROM), electronically erasable programmable read only memory (EEPROM), flash memory, or other memory technology, or any other medium that can be used to store media items or applications and data for access on electronic device 1700.

Memory 1710 may be used to store machine executable instructions that are executable on one or more processor(s) 1708 to implement any number of functional components, as well as data and content items that are rendered by electronic device 1700. As used herein and in the claims that follow, it is intended that the term "processor" shall encompass and apply to either one processor, a plurality of processors, or one or more processors that include multiple processing cores. Memory 1710 may store an operating system and a storage database to store one or more content items, such as eBooks, audio books, songs, videos, still images, and the like. Also, execution of at least a portion of the machine executable instruction stored in memory 1710, by one or more processors 1708, can be used to provide the pipeline used to implement a plurality of the procedures discussed above, to enhance the quality of an image rendered on one or more displays 1702.

Memory 1710 may also store one or more applications 1714 (1)-1714(N) that can execute on electronic device 1700. For example, the applications may include one or more of an electronic book reader application for rending electronic books, an audio player for playing audio books or songs, a video player for playing video, and so forth.

As illustrated in this example, memory 1710 stores a display module 1712 for rendering content on display 1702. In response to receiving a request to render an image on display 1702, display module 1712 can render the image that is enhanced by applying any of the techniques described herein to improve the quality of the image using the pipeline for processing input image data, so that successive different types of image improvement are implemented on the lines of the input image as they are processed through the pipeline. Images to be rendered can be preprocessed when initially loaded, or can be processed through the pipeline on the fly as the image is being rendered on one or more displays 1702. Other details and functional components for rendering an image on display(s) 1702 have been omitted, since they are not pertinent to the techniques disclosed herein.

In some instances, electronic device 1700 may have features or functionality in addition to those shown in FIG. 1. For example, electronic device 1700 may include additional data storage devices (removable and/or non-removable), such as magnetic disks, optical disks, tape, or the like, and corresponding readers for such media, as appropriate. The additional data storage media may include volatile and nonvolatile, removable and non-removable media implemented in any method or technology for storage of information, such as computer readable instructions, data structures, program modules, or other data. In addition, some or all of the functionality described as residing within electronic device 1700 may reside remotely from the electronic device in some implementations. In these implementations, electronic device 1700 may utilize one or more network interfaces 1716 to communicate with and utilize this functionality. It should also be noted that the machine executable instructions that are implemented by processor(s) 1708 (and/or by display module 1712) to render an image on display 1702 with the techniques discussed herein may also be transferred to electronic device 1700 from remote computing devices and/or remote data storage, via network interface(s) 1716 and stored in memory 1710 for execution by processor(s) 1708 and/or display module 1712.

While FIG. 17 shows one illustrative architecture for electronic device 1700, it is to be appreciated that multiple other architectures may implement the described techniques. For example, the pipeline can be implemented by display module 1712 as a separate graphics module with firmware or hardwired logic to implement the different image enhancement procedures in the pipeline.

Figures and Disclosed Embodiments are not Limiting

Illustrative embodiments are illustrated in referenced Figures of the drawings, as discussed above. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Although the subject matter has been described in language specific to illustrative structural features and/or methodological acts, it is to be understood that many other modifications can be made thereto within the scope of the claims that follow and that the subject matter defined in the appended claims is not necessarily limited to the specific features or acts described herein. Accordingly, the scope of these concepts is not in any way limited by the above description, but instead, the specific features and acts are simply disclosed as illustrative forms of implementing the claims.

What is claimed is:

1. A method for processing data from an input color image on an electronic device, the method comprising:

processing the data from the input color image using a graphics pipeline module, wherein the processing comprises sequentially applying a plurality of modifications to successive rows of pixels of the data from the input color image within the graphics pipeline module to produce modified data for use in displaying a modified color image on the electronic device, and wherein the plurality of modifications that are applied to the successive rows of pixels of the data from the input color image include two or more of:

enhancing a contrast of at least a portion of pixels comprising the data from the input color image;

color downsampling the data from the input color image, so that a color resolution of the modified color image that is to be displayed is less than that of the input color image;

increasing a color saturation of at least a portion of the pixels comprising the data from the input color image;

reducing fringing in the data from the input color image; or using dithering for smoothing color transitions in the pixels comprising the data from the input color image; and using the modified data produced by the graphics pipeline for displaying the modified color image on the electronic device.

2. The method of claim 1, wherein displaying the modified color image comprises selectively controlling ambient light reflectivity at each of a plurality of pixels comprising the modified color image, a first portion of the plurality of pixels comprising the modified color image each including a first color filter, a second portion of the plurality of pixels comprising the modified color image each including a second color filter, and a third portion of the plurality of pixels comprising the modified color image each including a third color filter, a pixel from each of the first portion, the second portion, and the third portion of the plurality of pixels comprising the modified color image being grouped with a fourth color pixel.

3. The method of claim 1, further comprising delaying processing of the data from the input color image before performing at least one of the modifications in the graphics pipeline module, until a predefined number of rows of pixels in the input color image that is less than a total number of rows of pixels in the input color image are available in the graphics pipeline module.

4. The method of claim 1, wherein reducing fringing in the data from the input color image comprises successively adjusting, using color data for a group of adjacent pixels of the input color image, a color of each color component for each pixel of the group, wherein the adjusting is performed as a function of one or more of a perceived color, a desired color, a perceived luma, or a desired luma.

5. A method for processing data on an electronic device, the method comprising:

repetitively inputting successive rows of pixels of an input color image into a graphics pipeline module for sequentially processing the successive rows of pixels;

processing the data for the successive rows of pixels of the input color image within the graphics pipeline module, by successively applying a plurality of different procedures to the data for the successive rows of pixels to produce modified data for use in displaying a modified color image, individual procedures of the different procedures modifying the data for the successive rows of pixels to compensate for limitations of a display on which the modified color image is to be displayed; and using the modified data produced by the graphics pipeline module for displaying the modified color image on the display.

6. The method of claim 5, wherein the plurality of different procedures includes one or more of:

color downsampling the data for the successive rows of pixels of the input color image, so that a color resolution of the modified color image that is to be displayed is less than that of the input color image;

reducing fringing in the modified color image that is to be displayed; or smoothing color transitions in the modified color image that is to be displayed by diffusing errors in color between adjacent pixels of the modified color image.

7. The method of claim 6, wherein the plurality of different procedures further includes one or more of:

increasing a contrast of at least a portion of pixels comprising the modified color image that is to be displayed; and increasing a color saturation in at least a portion of the modified color image that is to be displayed.

8. The method of claim 7, wherein each pixel of the input color image includes a plurality of color components, and wherein for successive pixels of the input color image, increasing the contrast of at least a portion of the modified color image that is to be displayed comprises:

for each color component of a pixel of the input color image that is currently being processed in the graphics pipeline module, modifying the color component by a predefined value, to produce a modified color component; and using each modified color component for each pixel of the modified color image when displaying the modified color image.

9. The method of claim 7, wherein each pixel of the input color image includes a plurality of color components, and wherein increasing the saturation in at least the portion of the modified color image that is to be displayed comprises:

for each pixel of the input color image that is processed in the graphics pipeline module, determining a maximum of the color components and a minimum of the color components;

for each pixel of the input color image, computing a difference value between the maximum and the minimum of the color components and an average of the maximum and minimum of the color components;

as a function of the difference and the average for each pixel that are thus computed, computing a boosted value for each of the color components of said pixel, each boosted value of the color components being used for a pixel in the modified color image that is to be displayed;

as a function of the minimum, the average, and the difference of the color components of the pixel of the input color image, computing a white pixel for the modified color image that is to be displayed; and using the boosted value for the color components and the white pixel when displaying the modified color image.

10. The method of claim 6, wherein each pixel of the input color image includes a plurality of different color components, and wherein for successive pixels of the input color image, the color downsampling comprises:

computing a luma value for a pixel of the input color image that is currently being processed within the graphics pipeline module, and luma values for each of a plurality of pixels adjacent to said pixel currently being processed;

subtracting the luma value for the pixel for which the luma value was computed, from each of the different color components of the pixel, for said pixel currently being processed and each of the plurality of pixels adjacent to said pixel currently being processed, producing modified color components for said pixel currently being processed and for each of the plurality of pixels adjacent to said pixel currently being processed;

for each successive pixel being processed, separately convolving each of the modified color components of the pixel being processed and of the plurality of pixels adjacent to said pixel being processed with a predefined blur filter and using a predefined blur strength control value, producing blur color components for the pixel being processed; and adding the luma value of the pixel being processed to each of the blur color components of said pixel, to produce downsampled color components for the pixel being processed.

11. The method of claim 6, wherein each pixel of the input color image includes a plurality of color components, and wherein reducing fringing in the modified color image to be displayed comprises processing successive pixels of the input color image in the graphics pipeline module, as follows:

for each pixel of the input color image processed in the graphics pipeline module, and as a function of the color components of each of a plurality of pixels adjacent to a pixel currently being processed, computing a perceived luma, and a desired luma, and for each color component of said pixel currently being processed, computing a perceived color component and a desired color component; and separately adjusting each color component of said pixel currently being processed as a function of the perceived luma, the desired luma, and as a function of the perceived color component, and the desired color component, to produce reduced fringing in the modified color image to be displayed.

12. The method of claim 6, further comprising delaying processing of the data for the input color image before implementing at least one of the plurality of different procedures, until a plurality of rows of pixels of the input color image are available in the graphics pipeline module.

13. The method of claim 6, wherein each pixel of the input color image includes a plurality of color components, and wherein for successive pixels, dithering comprises:

determining a diffusion error for a pixel of the input color image that is currently being processed; and propagating the diffusion error to predefined pixels adjacent to said pixel currently being processed, to produce the dithering in the modified color image that is to be displayed.

14. An electronic device comprising:

a display on which images are displayed and viewed using reflected light;

a memory storing machine executable instructions; and one or more processors coupled to the memory and to the display, the one or more processors executing the machine executable instructions to implement a plurality of functions, including:

repetitively inputting successive rows of pixels of an input color image into a graphics pipeline module for successively processing the successive rows of pixels;

processing data for the successive rows of pixels of the input color image within the graphics pipeline module, by successively applying a plurality of different procedures defined by the machine executable instructions to the data for the successive rows of pixels to produce modified data for use in displaying a modified color image on the display, individual procedures of the different procedures modifying the data for the successive rows of pixels to compensate for limitations of the display on which the modified color image is to be displayed; and using the modified data produced by the graphics pipeline module when displaying the modified color image on the display.

15. The electronic device of claim 14, wherein the plurality of different procedures defined by the machine executable instructions includes one or more of:

color downsampling the data for the successive rows of pixels of the input color image, so that a color resolution of the modified color image that is to be displayed is less than that of the input color image;

reducing fringing in the modified color image that is to be displayed; or smoothing color transitions in the modified color image that is to be displayed by diffusing errors in color between adjacent pixels of the modified color image.

16. The electronic device of claim 15, wherein the plurality of different procedures further includes one or more of:

increasing a contrast of at least a portion of pixels comprising the modified color image that is to be displayed; and increasing a color saturation in at least a portion of the modified color image that is to be displayed.

17. The electronic device of claim 16, wherein each pixel of the input color image includes a plurality of color components, and wherein for successive pixels of the input color image, processing in the graphics pipeline module increases the contrast of at least a portion of the modified color image by:

for each color component of a pixel of the input color image that is currently being processed in the graphics pipeline module, modifying the color component by a predefined value, to produce a modified color component; and using each modified color component for each pixel of the modified color image when displaying the modified color image.

18. The electronic device of claim 16, wherein each pixel of the input color image includes a plurality of color components, and wherein processing of the data within the graphics pipeline module increases the saturation of color components in the modified color image that is to be displayed by:

for each pixel of the input color image that is processed in the graphics pipeline module, determining a maximum of the color components and a minimum of the color components;

for each pixel of the input color image that is processed within the graphics pipeline module, computing a difference value between the maximum and the minimum of the color components and an average of the maximum and minimum of the color components;

as a function of the difference and the average for each pixel that are thus computed, computing a boosted value for each of the color components of said pixel, each boosted value of the color components being used for a pixel in the modified color image that is to be displayed;

as a function of the minimum, the average, and the difference of the color components, computing a white pixel for the modified color image to be displayed; and using the boosted value for the color components and the white pixel when displaying the modified color image.

19. The electronic device of claim 15, wherein each pixel of the input color image includes a plurality of color components, and wherein for successive pixels of the input color image, color downsampling is implemented in the graphics pipeline module by:

computing a luma value for a pixel of the input color image that is currently being processed within the graphics pipeline module, and luma values for each of a plurality of pixels adjacent to said pixel currently being processed;

subtracting the luma value for the pixel for which the luma value was computed from each of the different color components of the pixel, for said pixel current being processed and each of the plurality of pixels adjacent to said pixel currently being processed, producing modified color components for said pixel currently being processed and for each of the plurality of pixels adjacent to said pixel currently being processed;

for each successive pixel being processed, separately convolving each of the modified color components of the pixel being processed and of the plurality of pixels adjacent to said pixel being processed with a predefined blur filter and using a predefined blur strength control value, producing blur color components for the pixel being processed; and adding the luma value of the pixel being processed to each of the blur color components of said pixel, to produce downsampled color components for the pixel being processed.

20. The electronic device of claim 15, wherein each pixel of the input color image includes a plurality of color components, and wherein reducing fringing in the modified color image to be displayed is implemented by processing successive pixels of the input color image in the graphics pipeline module, as follows:

for each pixel of the input color image processed in the graphics pipeline module, and as a function of the color components of each of a plurality of pixels adjacent to a pixel currently being processed, computing a perceived luma, and a desired luma, and for each color component of said pixel currently being processed, computing a perceived color component and a desired color component; and separately adjusting each color component of said pixel currently being processed as a function of the perceived luma, the desired luma, and as a function of the perceived color component, and the desired color component, to reduce fringing in the modified color image to be displayed.

21. The electronic device of claim 15, wherein processing the data for the input color image in the graphics pipeline module is delayed before implementing at least one of the procedures until a plurality of rows of pixels of the input color image are available in the graphics pipeline module.

22. The electronic device of claim 15, wherein each pixel of the input color image includes a plurality of color components, and wherein for successive pixels, the one or more processors implement dithering within the graphics pipeline module by:

determining a diffusion error for a pixel of the input color image that is currently being processed in the graphics pipeline module; and propagating the diffusion error to predefined pixels adjacent to said pixel currently being processed, to produce the dithering in the modified color image that is to be displayed.

23. One or more non-transitory, tangible computer-readable media storing computer executable instructions that, when executed, cause one or more processors of an electronic device having a display to perform a plurality of functions, including:

repetitively inputting data for successive rows of pixels of an input color image into a graphics pipeline module for processing, producing modified data for use in displaying a modified color image;

processing the data for individual rows of the successive rows of pixels of the input color image within the graphics pipeline module, by successively applying a plurality of different procedures to the individual rows, individual procedures of the different procedures modifying the data for the individual rows to compensate for limitations of a display on which the modified color image is to be displayed; and using the modified data for displaying the modified color image on the display.

24. The one or more non-transitory, tangible computer-readable media storing computer executable instructions of claim 23, wherein the plurality of different procedures includes one or more of:

color downsampling the data for the successive rows of pixels of the input color image, so that a color resolution of the modified color image that is to be displayed is less than that of the input color image;

reducing fringing in the modified color image that is to be displayed; and smoothing color transitions in the modified color image that is to be displayed by diffusing errors in color between adjacent pixels of the modified color image.

25. The one or more non-transitory, tangible computer-readable media storing computer executable instructions of claim 24, wherein the plurality of different procedures further includes one or more of:

increasing a contrast of at least a portion of the modified color image that is to be displayed; and increasing a color saturation in at least a portion of the modified color image that is to be displayed.

26. The one or more non-transitory, tangible computer-readable media storing computer executable instructions of claim 25, wherein each pixel of the input color image includes a plurality of color components, and wherein for successive pixels of the input color image, increasing the contrast of at least a portion of the modified color image that is to be displayed comprises:

for each color component of a pixel of the input color image that is currently being processed in the graphics pipeline module, modifying the color component by a predefined value, to produce a modified color component; and using each modified color component for each pixel of the modified color image when displaying the modified color image.

27. The one or more non-transitory, tangible computer-readable media storing computer executable instructions of claim 25, wherein each pixel of the input color image includes a plurality of color components, and wherein increasing the saturation in at least the portion of the modified color image that is to be displayed comprises:

for each pixel of the input color image that is processed in the graphics pipeline module, determining a maximum of the color components and a minimum of the color components;

for each pixel of the input color image, computing a difference value between the maximum and the minimum of the color components and an average of the maximum and minimum of the color components;

as a function of the difference and the average for each pixel that are thus computed, computing a boosted value for each of the color components of said pixel, each boosted value of the color components being used for a pixel in the modified color image that is to be displayed;

as a function of the minimum, the average, and the difference of the color components, computing a white pixel for the modified color image that is to be displayed; and using the boosted value for the color components and the white pixel when displaying the modified color image.

28. The one or more non-transitory, tangible computer-readable media storing computer executable instructions of claim 24, wherein each pixel of the input color image includes a plurality of color components, and wherein for successive pixels, the color downsampling comprises:

computing a luma value for a pixel of the input color image that is currently being processed within the graphics pipeline module, and luma values for each of a plurality of pixels adjacent to said pixel currently being processed;

subtracting the luma value for the pixel for which the luma value was computed, from each of the different color components of the pixel, for said pixel currently being processed and each of the plurality of pixels adjacent to said pixel currently being processed, producing modified color components for said pixel currently being processed and for each of the plurality of pixels adjacent to said pixel currently being processed;

for each successive pixel being processed, separately convolving each of the modified color components of the pixel being processed and of the plurality of pixels adjacent to the pixel being processed with a predefined blur filter and using a predefined blur strength control value, producing blur color components for the pixel being processed; and adding the luma value of the pixel being processed to each of the blur color components of said pixel, to produce downsampled color components for the pixel being processed.

29. The one or more non-transitory, tangible computer-readable media storing computer executable instructions of claim 24, wherein each pixel of the input color image includes a plurality of color components, and wherein reducing fringing in the modified color image comprises processing successive pixels of the input color image in the graphics pipeline module, as follows:

for each pixel of the input color image processed in the graphics pipeline module, and as a function of the color components of each of a plurality of pixels adjacent to a pixel currently being processed, computing a perceived luma, and a desired luma, and for each color component of said pixel currently being processed, computing a perceived color component and a desired color component; and separately adjusting each color component of said pixel currently being processed as a function of the perceived luma, the desired luma, and as a function of the perceived color component, and the desired color component, to produce a reduced fringe in the modified color image to be displayed.

30. The one or more non-transitory, tangible computer-readable media storing computer executable instructions of claim 24, wherein the machine executable instructions further cause delaying processing of the input color image for at least one of the plurality of different procedures until a plurality of rows of pixels of the input color image are available in the graphics pipeline module.

31. The one or more non-transitory, tangible computer-readable media storing computer executable instructions of claim 24, wherein each pixel of the input color image includes a plurality of color components, and wherein for successive pixels, dithering comprises:

determining a diffusion error for a pixel of the input color image that is currently being processed; and propagating the diffusion error to predefined pixels adjacent to said pixel currently being processed, to produce the dithering in the modified color image that is to be displayed.

32. An electronic device comprising:

a display on which images are displayed and viewed using reflected light;

a memory storing machine executable instructions;

a graphics pipeline module; and one or more processors coupled to the memory and to the display, the one or more processors executing the machine executable instructions to implement a plurality of functions, including:

processing data from an input color image using the graphics pipeline module, wherein the processing comprises sequentially applying a plurality of modifications to successive rows of pixels of the data from the input color image within the graphics pipeline module to produce modified data for use in displaying a modified color image on the display, and wherein the plurality of modifications to the successive rows of pixels of the data from the input color image include two or more of:

enhancing a contrast of at least a portion of pixels comprising the data from the input color image;

color downsampling the data from the input color image, so that a color resolution of the modified color image that is to be displayed is less than that of the input color image;

increasing a color saturation of at least a portion of the pixels comprising the data from the input color image;

reducing fringing in the data from the input color image; or using dithering for smoothing color transitions in the pixels comprising the data from the input color image; and using the modified data produced by the graphics pipeline for displaying the modified color image on the display.

33. The electronic device of claim 32, wherein displaying the modified color image comprises selectively controlling ambient light reflectivity at each of a plurality of pixels comprising the modified color image, a first portion of the plurality of pixels comprising the modified color image each including a first color filter, a second portion of the plurality of pixels comprising the modified color image each including a second color filter, and a third portion of the plurality of pixels comprising the modified color image each including a third color filter, a pixel from each of the first portion, the second portion, and the third portion of the plurality of pixels comprising the modified color image being grouped with a fourth color pixel.

34. The electronic device of claim 32, further comprising delaying processing of the data from the input color image before performing at least one of the modifications in the graphics pipeline module, until a predefined number of rows of pixels in the input color image that is less than a total number of rows of pixels in the input color image are available in the graphics pipeline module.

35. The electronic device of claim 32, wherein reducing fringing in the data from the input color image comprises successively adjusting, using color data for a group of adjacent pixels of the input color image, a color of each color component for each pixel of the group, wherein the adjusting is performed as a function of one or more of a perceived color, a desired color, a perceived luma, or a desired luma.

36. One or more non-transitory computer-readable media storing computer executable instructions that, when executed, cause one or more processors of an electronic device having a display to perform a plurality of functions, including:

processing data from the input color image using a graphics pipeline module, wherein the processing comprises sequentially applying a plurality of modifications to successive rows of pixels of the data from the input color image within the graphics pipeline module to produce modified data for use in displaying a modified color image on the display, and wherein the plurality of modifications to the successive rows of pixels of the data from the input color image include two or more of:

enhancing a contrast of at least a portion of pixels comprising the data from the input color image;

color downsampling the data from the input color image, so that a color resolution of the modified color image that is to be displayed is less than that of the input color image;

increasing a color saturation of at least a portion of the pixels comprising the data from the input color image;

reducing fringing in the data from the input color image; or using dithering for smoothing color transitions in the pixels comprising the data from the input color image; and using the modified data produced by the graphics pipeline for displaying the modified color image on the display.

37. The one or more non-transitory computer-readable media storing computer executable instructions of claim 36, wherein displaying the modified color image comprises selectively controlling ambient light reflectivity at each of a plurality of pixels comprising the modified color image, a first portion of the plurality of pixels comprising the modified color image each including a first color filter, a second portion of the plurality of pixels comprising the modified color image each including a second color filter, and a third portion of the plurality of pixels comprising the modified color image each including a third color filter, a pixel from each of the first portion, the second portion, and the third portion of the plurality of pixels comprising the modified color image being grouped with a fourth color pixel.

38. The one or more non-transitory computer-readable media storing computer executable instructions of claim 36, further comprising delaying processing of the data from the input color image before performing at least one of the modifications in the graphics pipeline module, until a predefined number of rows of pixels in the input color image that is less than a total number of rows of pixels in the input color image are available in the graphics pipeline module.

39. The one or more non-transitory computer-readable media storing computer executable instructions of claim 36, wherein reducing fringing in the data from the input color image comprises successively adjusting, using color data for a group of adjacent pixels of the input color image, a color of each color component for each pixel of the group, wherein the adjusting is performed as a function of one or more of a perceived color, a desired color, a perceived luma, or a desired luma.

* * * * *